(12) United States Patent
Asauchi

(10) Patent No.: US 7,660,008 B2
(45) Date of Patent: Feb. 9, 2010

(54) ACCESS TO PRINTING MATERIAL CONTAINER

(75) Inventor: Noboru Asauchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 11/542,113

(22) Filed: Oct. 4, 2006

(65) Prior Publication Data
US 2007/0030508 A1  Feb. 8, 2007

Related U.S. Application Data

(63) Continuation of application No. 09/893,685, filed on Jun. 29, 2001, now Pat. No. 7,321,436.

(30) Foreign Application Priority Data

Jun. 30, 2000  (JP) .............................. 2000-199256

(51) Int. Cl.
*G06F 3/12* (2006.01)
(52) U.S. Cl. .................... 358/1.15; 358/1.14; 358/1.16; 358/305; 358/1.4; 399/106
(58) Field of Classification Search ............... 358/1.15, 358/1.16, 305, 1.4; 399/106
See application file for complete search history.

(56) References Cited

U.S. PATENT DOCUMENTS

| 3,889,236 | A |   | 6/1975  | Herger et al. |
| 4,689,740 | A |   | 8/1987  | Moelands et al. |
| 5,426,612 | A | * | 6/1995  | Ichige et al. ................ 365/220 |
| 5,434,862 | A |   | 7/1995  | Lokhoff |
| 5,438,682 | A | * | 8/1995  | Kumagai ..................... 712/10 |
| 5,548,559 | A |   | 8/1996  | Mochizuki |
| 5,623,611 | A | * | 4/1997  | Matsukawa et al. ........... 710/52 |
| 5,671,393 | A | * | 9/1997  | Yamaki et al. .............. 711/150 |
| 5,701,402 | A |   | 12/1997 | Miyamoto et al. |
| 5,745,912 | A |   | 4/1998  | Konishi |
| 5,852,608 | A | * | 12/1998 | Csoppenszky et al. ...... 370/465 |
| 5,983,311 | A |   | 11/1999 | Huang |
| 6,065,824 | A |   | 5/2000  | Bullock et al. |

(Continued)

FOREIGN PATENT DOCUMENTS

CN      1257007      11/1999

(Continued)

*Primary Examiner*—Edward L Coles
*Assistant Examiner*—Benjamin O Dulaney
(74) *Attorney, Agent, or Firm*—Stroock & Stroock & Lavan LLP

(57) ABSTRACT

The present invention provides a storage device that enables identification data to be readily rewritten and ensures normal completion of a data writing operation in a short time period. In the storage device of the invention, an ID comparator determines whether or not identification data transmitted from a host computer coincides with identification data stored in a memory array. In the case of coincidence, the ID comparator sends an access enable signal EN to an operation code decoder. The operation code decoder analyzes a write/read command, switches over a direction of data transfer with regard to the memory array based on a result of the analysis, and requires an I/O controller to change a high impedance setting of a signal line connecting with a data terminal DT. This series of processing allows access to an address in the memory array specified by a count on an address counter.

7 Claims, 15 Drawing Sheets

U.S. PATENT DOCUMENTS

| | | | |
|---|---|---|---|
| 6,122,320 A * | 9/2000 | Bellifemine et al. | 375/240 |
| 6,289,402 B1 * | 9/2001 | Davis | 710/31 |
| 6,312,088 B1 | 11/2001 | Seino | |
| 6,360,174 B1 | 3/2002 | Shoki | |
| 6,371,586 B1 * | 4/2002 | Saruta | 347/7 |
| 6,429,871 B1 * | 8/2002 | Katsura et al. | 345/501 |
| 6,447,090 B1 * | 9/2002 | Saruta | 347/19 |
| 6,473,191 B2 * | 10/2002 | Kohno | 358/1.13 |
| 6,512,597 B1 * | 1/2003 | Cooper et al. | 358/1.9 |
| 6,565,198 B2 | 5/2003 | Saruta et al. | |
| 6,665,799 B1 * | 12/2003 | Slama | 726/30 |
| 6,762,854 B1 * | 7/2004 | Murakami et al. | 358/1.16 |
| 7,268,897 B1 * | 9/2007 | Moro et al. | 358/1.13 |
| 2002/0003634 A1 * | 1/2002 | Kohno | 358/1.13 |

FOREIGN PATENT DOCUMENTS

| | | |
|---|---|---|
| CN | 1257007 A | 6/2000 |
| EP | 0 589 499 | 3/1994 |
| EP | 0 699 978 | 3/1996 |
| EP | 1 004 449 A2 | 5/2000 |
| EP | 1 004 450 | 5/2000 |
| EP | 1004449 A2 * | 5/2000 |
| EP | 1 081 638 | 3/2001 |
| JP | 61-49751 | 11/1981 |
| JP | 01-8384 | 10/1982 |
| JP | 58-80694 | 5/1983 |
| JP | 63-44266 | 8/1986 |
| JP | 63-197251 | 2/1987 |
| JP | 2933090 | 4/1990 |
| JP | 2-257494 | 10/1990 |
| JP | 05-193127 | 1/1992 |
| JP | 04-049142 B2 | 8/1992 |
| JP | 07-57489 | 8/1993 |
| JP | 06-126981 A | 5/1994 |
| JP | 07-319765 | 5/1994 |
| JP | 11-314375 | 5/1998 |
| JP | 2000-158665 | 6/2000 |
| KR | 2000-0035642 | 6/2000 |
| WO | WO 00/21756 | 4/2000 |
| WO | WO 00/26034 | 5/2000 |

* cited by examiner

ACCESS TO PRINTING MATERIAL CONTAINER

BACKGROUND OF THE INVENTION

1. Field of the Invention

The present invention relates to storage devices that are mutually connected via a bus. More specifically the present invention pertains to a technique of identifying a desired storage device among a plurality of storage devices that are connected with one another via a bus.

2. Description of the Related Art

A variety of techniques have been proposed to select a desired storage device among a plurality of storage devices (memories) included in a memory module and carry out a writing/reading operation of data into and from the selected storage device. In a system including a plurality of storage devices connecting with a data signal line and a clock signal line via a bus, one practical technique causes identification information to be stored in advance in each storage device in some physical way, for example, using a pull-up resistance, and gains access to the desired storage device based on the identification information. In this technique, a data array to be transmitted includes a start bit representing start of the data array and an end bit representing end of the data array. Access to each storage device is specified by the combination of the start bit, the end bit, and the clock signal.

Another practical technique uses chip select signal lines in addition to the data signal line and the clock signal line and transmits a chip select signal to select a desired storage device. This technique gains access to only a storage device receiving the chip select signal among the plurality of storage devices and carries out the writing/reading operation into and from the accessed storage device.

The former technique storing the physical identification information in the storage device, for example, with a pull-up resistance, however, it is practically impossible to rewrite the identification information stored in each storage device. This technique is accordingly not suitable for recycle. The access to each storage device is specified by the combination of the start bit, the end bit, and the clock signal. In the case of accidental cutoff of the power supply during the access to the storage device, the writing operation of data can not be concluded normally.

The latter technique requires a plurality of chip select signal lines corresponding to the number of the storage devices. This undesirably requires the heavy wiring load of the signal lines and complicates the layout design. Only one chip select signal line is utilized for access, which worsens the utilization efficiency of the signal lines.

SUMMARY OF THE INVENTION

The object of the present invention is thus to provide a storage device that enables identification data to be readily rewritten and ensures normal completion of a data writing operation in a short time period.

At least part of the above and the other related objects is attained by a first application of the present invention, which is directed to a printing material container detachably attached to a printing apparatus having a clock signal line, a data signal line, and a reset signal line. The printing material container in the first application of the present invention includes: a reservoir unit that keeps a printing material therein; a clock terminal that receives a clock signal sent via the clock signal line of the printing apparatus; a data terminal that transmits a data signal to and from the data signal line of the printing apparatus; a reset terminal that receives a reset signal sent via the reset signal line of the printing apparatus; a storage element having a plurality of non-volatile storage areas that are sequentially accessed; and a storage element control unit that is initialized at a first level of the input reset signal and carries out a writing/reading operation of data into and from the storage element according to the data signal synchronously with the input clock signal when the reset signal is switched over to a second level.

In the printing material container according to the first application of the present invention, the writing/reading operation of data into and from the storage element is performed in response to a variation in level of the reset signal as the trigger. This arrangement enables the writing/reading operation of data into and from a desired printing material container (storage element) among a plurality of printing material containers (storage elements).

In the printing material container according to the first application of the invention, it is preferable that data are written into the storage element bit by bit. This arrangement enables data to be written quickly. Even when the reset signal is input during a writing operation, this arrangement ensures normal completion of the writing operation of data without causing any abnormal conversion of the data.

In accordance with one preferable embodiment of the printing material container in the first application of the invention, the storage element stores identification information therein. The storage element control unit includes: a data bus that connects the data terminal with the storage element; an address counter that increments a count thereon synchronously with the clock signal input via the clock terminal and resets the count to an initial value in response to input of the reset signal via the reset terminal; an input-output controller that is electrically connected with both the storage element and the data bus and controls a direction of data transfer with regard to the storage element as well as a direction of data transfer with regard to the data bus; a comparator that compares printing material container identification information, which is assigned to the printing material container for identification thereof and is input via the data bus, with identification information stored in the storage element to determine coincidence or incoincidence of the two pieces of identification information; and a write/read enable unit that allows the writing/reading operation of data into and from the storage element according to the data signal in the case of coincidence of the two pieces of identification information.

The above arrangement allows access only to a desired printing material container (storage device). Especially in a system including a plurality of printing material containers, this arrangement ensures access for a writing or reading operation to a desired printing material container selected among the plurality of printing material containers. The writing operation of data into the storage element is not allowed during the comparison between the identification information stored in the storage device of the printing material container and the input identification information to determine coincidence or incoincidence thereof. This keeps the read only state of the identification information stored in the storage element.

In one preferable arrangement of the printing material container according to the first application of the present invention, the input-output controller sets the direction of data transfer with regard to the storage element to a reading direction and cuts off connection with the data bus as initial settings, in response to input of the reset signal. This arrangement enables the storage element to be set in the read only state in response to input of the reset signal as the trigger.

In accordance with one preferable embodiment of the first application of the present invention, the printing material container further includes a command decoder that connects with the data bus and the comparator, analyzes a write/read command input via the data bus when a result of the determination by the comparator represents coincidence of the printing material container identification information with the identification information stored in the storage element, and requires the input-output controller to switch over the direction of data transfer with regard to the data bus based on a result of the analysis. The input-output controller keeps the initial settings for the direction of data transfer with regard to the storage element and the cutoff state of connection with the data bus until the command decoder completes the analysis of the write/read command.

This embodiment enables data to be written into and read from the storage device included in a selected printing material container. This arrangement prohibits the writing/reading operation of data into and from the storage element until completion of the analysis of the write/read command. This allows data to be written at or read from a specific position in the storage element.

In accordance with another preferable embodiment according to the first application of the invention, the printing material container further includes: a test terminal that connects with a test mode signal line; and a test mode controller that connects with the test terminal and detects input of a test mode signal. The storage element has a specific section between a head position and a predetermined position of the storage area, where the specific section is subjected to a writing operation under a predetermined condition and otherwise stores the identification information in an unrewritable manner. Here the predetermined condition is detection of input of the test mode signal. This arrangement enables data to be written in the specific section of the storage element.

In one preferable application of the above embodiment, the test mode controller outputs a test mode command to the command decoder for analysis thereof when detecting the input of the test mode signal, and prohibits increment of the count on the address counter until the command decoder completes the analysis of the test mode command. The command decoder requires the input-output controller to carry out a writing operation into the storage element and release of the data bus after the analysis of the test mode command. The input-output controller carries out the writing operation into the storage element and the release of the data bus in response to the requirement from the command decoder. In another preferable application of this embodiment, the command decoder requires the input-output controller to carry out a reading operation from the storage element and release of the data bus after the analysis of the test mode command. The input-output controller carries out the reading operation from the storage element and the release of the data bus in response to the requirement from the command decoder.

The above arrangement enables activation of the command decoder without receiving the result of determination representing coincidence of the two pieces of identification information from the comparator. The input-output controller carries out the writing/reading operation of data into and from the storage element, as well as the release of the data bus. Incrementing the count on the address counter is prohibited until the command decoder completes the analysis of the test mode command. Data can thus be written from the head position in the storage element. This arrangement allows the identification information stored in the storage element to be rewritten. The arrangement of prohibiting increment of the count on the address counter until the command decoder completes the analysis of the test mode command also enables data to be read from the head position in the storage element.

In the printing material container according to the first application of the present invention, it is preferable the storage element has a writable data area, in which data are writable, after a storage area of the identification information. Data regarding at least a quantity of the printing material may be written into the writable data area. It is further preferable that the storage element has a specific section between a head position and a predetermined position of the storage area, where the specific section is subjected to a writing operation under a predetermined condition and otherwise stores the identification information in an unrewritable manner. This arrangement enables the specific section between the head position and the predetermined position to be used as a read only area.

A second application of the present invention is a non-volatile storage device that is detachably attached to a printing material container and connects with a clock signal line, a data signal line, and a reset signal line. The storage device in the second application of the invention includes: a storage element having a plurality of non-volatile storage areas that are sequentially accessed; and a storage element control unit that is initialized at a first level of an input reset signal and carries out a writing/reading operation of data into and from the storage element according to a data signal synchronously with an input clock signal when the reset signal is switched over to a second level.

The storage device in the second application of the present invention exerts the same functions and effects as those of the printing material container in the first application of the present invention. A variety of arrangements and embodiments discussed above with regard to the printing material container in the first application of the invention are also applicable to the storage device in the second application of the invention.

A third application of the present invention is actualized by a plurality of printing material containers, each including a non-volatile storage device that is mounted thereon and connects with a control unit via a bus with a clock terminal, a data terminal, and a reset terminal. The control unit has a clock signal generation circuit that generates a clock signal, a reset signal generation circuit that generates a reset signal, an identification information output circuit that outputs identification information to identify a desired printing material container among the plurality of printing material containers, and a data output circuit that transmits a data array including the output identification information and a write/read command to a data signal line synchronously with the clock signal. Each of the printing material containers in the third application of the invention includes: a data bus that connects with the data terminal; a storage element that stores a different piece of identification information assigned to each printing material container and has a storage area sequentially accessed; a comparator that connects with the data bus and compares the identification information output from the control unit with the identification information stored in the storage element to determine coincidence or incoincidence of the two pieces of identification information; an input-output controller that is interposed between the storage element and the data bus and controls a direction of data transfer with regard to the storage element as well as a direction of data transfer with regard to the data bus; and a command decoder that connects with the data bus and the comparator, analyzes the write/read command input via the data bus when a result of the determination by the comparator represents coincidence of the identification information output from the control unit with the identification information stored in the storage element, and requires the input-output controller to switch over the direction of data transfer with regard to the data bus based on a result of the analysis.

The arrangement of the third application of the present invention enables a desired printing material container to be selected among the plurality of printing material containers without any exclusive signal line for the selection. The writing operation of data into the storage element is not allowed during the comparison between the identification information stored in the storage device and the input identification information to determine coincidence or incoincidence thereof. This keeps the read only state of the identification information stored in the storage element. Data can be written into and read from only the selected storage device.

In accordance with one preferable embodiment of the third application of the present invention, each of the printing material containers further includes an address counter that increments a count thereon synchronously with the clock signal input via the clock terminal to specify a position in the storage area of the storage element to be accessed, and resets the count to an initial value at a time of initialization. The input-output controller sets the direction of data transfer with regard to the storage element to a reading direction and prohibits data transfer with regard to the data bus as initial settings, and maintains the initial settings until the command decoder completes the analysis of the write/read command.

This embodiment ensures the writing/reading operation of data into and from the storage device included in the selected printing material container. The writing/reading operation of data into and from the storage element is prohibited until completion of the analysis of the write/read command. This arrangement enables data to be written or read from a predetermined position in the storage element.

In the third application of the present invention, it is preferable that the comparators of the respective storage devices have common identification information common to all the storage devices. This arrangement allows selection of all the printing material containers as the desired printing material containers to be accessed.

In accordance with another preferable embodiment of the third application of the invention, a power supply compensation circuit included in the control unit gives compensational power supply to each of the printing material containers for a predetermined time period after cutoff of general power supply. The reset signal is generated on at least either one of an occasion of starting power supply to the control unit and an occasion of cutoff of the power supply. In the case of detection of input of the reset signal during a writing operation of data, transmission of the data to the data terminal is terminated immediately and preferential data is instantly transmitted to the each data terminal one by one to be completely written in the predetermined time period when the power supply compensation circuit gives the compensational power supply.

Even in the case of accidental cutoff of the power supply, this arrangement enables the preferential data, for example, data on the quantity of consumption of ink used as the printing material or on the remaining quantity of ink, to be completely written in the storage element.

In the third application of the present invention, the clock signal input to the clock terminal may have a longer cycle in the case of input of a write command than a cycle in the case of output of a read command. This arrangement ensures a sufficient time period for the writing operation of data, while shortening the access time to the storage device.

In accordance with still another preferable embodiment of the third application of the invention, the plurality of printing material containers are mounted on a module substrate with a printing material container detection signal line that is laid thereon to give cascade connection with each printing material container and have one grounded end and the other end connecting with the control unit. The control unit determines whether or not all the printing material containers are properly mounted on the module substrate, based on a value of the printing material container detection signal line.

The embodiment detects proper or improper attachment of the printing material containers to the module substrate. This arrangement is adopted, for example, to determine whether or not ink cartridges for an ink jet printer, which respectively have the storage devices, are properly attached to an ink cartridge holder.

In the third application of the present invention, it is preferable that the control unit determines that all the printing material containers are mounted properly on the module substrate when the printing material container detection signal line shows a ground voltage. It is also preferable that the control unit determines that at least one printing material container is not properly mounted on the module substrate when the printing material container detection signal line shows a voltage other than a ground voltage.

In the third application of the present invention, the storage element may store a diversity of data regarding a type of the printing material accommodated in each printing material container. In one preferable configuration, power supply to each printing material container is allowed only when the control unit carries out a writing/reading operation of data. This arrangement ensures the power supply to the storage device according to the requirements.

A fourth application of the present invention is actualized by a plurality of non-volatile storage devices, each connecting with a control unit via a bus with a clock terminal, a data terminal, and a reset terminal. The control unit has a clock signal generation circuit that generates a clock signal, a reset signal generation circuit that generates a reset signal, an identification information output circuit that outputs identification information to identify a desired storage device among the plurality of storage devices, and a data output circuit that transmits a data array including the output identification information and a write/read command to a data signal line synchronously with the clock signal. Each of the storage devices in the fourth application of the invention includes: a data bus that connects with the data terminal; a storage element that has a storage area sequentially accessed; a comparator that connects with the data bus and compares the identification information output via the identification information output circuit and the data output circuit of the control unit with identification information stored in the storage element to determine coincidence or incoincidence of the two pieces of identification information; an input-output controller that is interposed between the storage element and the data bus and controls a direction of data transfer with regard to the storage element as well as a direction of data transfer with regard to the data bus; and a command decoder that connects with the data bus and the comparator, analyzes the write/read command input via the data bus when a result of the determination by the comparator represents coincidence of the identification information output from the control unit with the identification information stored in the storage element, and requires the input-output controller to switch over the direction of data transfer with regard to the data bus based on a result of the analysis.

The storage device in the fourth application of the present invention exerts the same functions and effects as those of the printing material container in the third application of the present invention. A variety of arrangements and embodiments discussed above with regard to the printing material container in the third application of the invention are also applicable to the storage device in the fourth application of the invention.

The present invention is further directed as its fifth application to a printing material container detachably attached to a printing apparatus having a clock signal line, a data signal line, and a reset signal line. The printing material container in the fifth application of the invention includes: a reservoir unit that keeps a printing material therein; a clock terminal connecting with the clock signal line of the printing apparatus via a bus; a data terminal connecting with the data signal line of the printing apparatus via the bus; a reset terminal connecting with the reset signal line of the printing apparatus via the bus; a storage element that has a non-volatile storage area and is subjected to a writing/reading operation based on a clock signal input via the clock terminal and a data signal input and output via the data terminal; a comparator that compares printing material container identification information, which is included in the data signal and assigned to the printing material container for identification thereof, with identification information stored in advance in the storage element to determine coincidence or incoincidence of the two pieces of identification information; and an input-output controller that allows the writing/reading operation into and from the storage element when the comparator determines coincidence of the two pieces of identification information.

In the printing material container according to the fifth application of the present invention, the identification information stored in advance in the storage element is compared with the printing material container identification information included in the data signal, for the purpose of determination of coincidence or incoincidence of the two pieces of identification information. This arrangement enables the writing/reading operation of data to be carried out with regard to a desired printing material container (storage element) selected among a plurality of printing material containers (storage elements).

In the printing material container according to the fifth application of the present invention, the identification information may be stored in the storage element. It is preferable that the input-output controller allows the writing/reading operation into and from the storage element only when a reset signal input via the reset terminal satisfies a predetermined condition. In this arrangement, the writing/reading operation into and from the storage element is controlled by the reset signal.

In the printing material container according to the fifth application of the present invention, it is preferable that the storage element is sequentially accessed in synchronism with the clock signal. It is also preferable that the storage element has information regarding a quantity of the printing material kept in the printing material container, and that the identification information is stored at a specific position accessed prior to the information regarding the quantity of the printing material. This arrangement enables the identification information to be read out first.

In the printing material container according to the fifth application of the present invention, the predetermined condition may be that the reset signal input via the reset terminal switches over a state thereof from a first level to a second level. The writing/reading operation into and from the storage element can thus be controlled in response to a variation in level of the reset signal as the trigger.

The present invention is further directed as its sixth application to a non-volatile storage device that connects with a clock signal line, a data signal line, and a reset signal line and is detachably attached to a printing material container. The storage device in the sixth application of the present invention includes: a storage element that has a non-volatile storage area and is subjected to a writing/reading operation based on a clock signal input via the clock signal line and a data signal input and output via the data signal line; a comparator that compares printing material container identification information, which is included in the data signal and assigned to the printing material container for identification thereof, with identification information stored in advance in the storage element to determine coincidence or incoincidence of the two pieces of identification information; and an input-output controller that allows the writing/reading operation into and from the storage element when the comparator determines coincidence of the two pieces of identification information.

The storage device in the sixth application of the present invention exerts the same functions and effects as those of the printing material container in the fifth application of the present invention. A variety of arrangements and embodiments discussed above with regard to the printing material container in the fifth application of the invention are also applicable to the storage device in the sixth application of the invention.

The present invention is further directed as its seventh application to a storage system including a plurality of printing material containers and a control unit. Each printing material container has a non-volatile storage device that connects with a clock signal line, a data signal line, and a reset signal line via a bus and a reservoir unit that keeps a printing material therein. The control unit connects with the storage device included in the printing material container via the clock signal line, the data signal line, and the reset signal line. The control unit includes: a clock signal generation circuit that generates a clock signal; a reset signal generation circuit that generates a reset signal for initializing the storage device; an identification information output circuit that outputs identification information to identify a storage device included in a desired printing material container among the plurality of printing material containers; and a data output circuit that transmits a data array including the output identification information and a write/read command to the data signal line synchronously with the clock signal. The storage device included in each printing material container includes: a data bus that connects with the data signal line; a storage element that has a storage area sequentially accessed; a comparator that connects with the data bus and compares the identification information output from the control unit with identification information stored in the storage element to determine coincidence or incoincidence of the two pieces of identification information; an input-output controller that is interposed between the storage element and the data bus and controls a direction of data transfer with regard to the storage element as well as a direction of data transfer with regard to the data bus; and a command decoder that connects with the data bus and the comparator, analyzes the write/read command input via the data bus when a result of the determination by the comparator represents coincidence of the identification information output from the control unit with the identification information stored in the storage element, and requires the input-output controller to switch over the direction of data transfer with regard to the data bus based on a result of the analysis.

The arrangement of the seventh application of the present invention enables a desired printing material container to be selected among the plurality of printing material containers without any exclusive signal line for the selection. The writing operation of data into the storage element is not allowed during the comparison between the identification information stored in the storage device and the input identification information to determine coincidence or incoincidence thereof. This keeps the read only state of the identification information stored in the storage element. Data can be written into and read from only the selected storage device.

In accordance with one preferable embodiment of the storage system in the seventh application of the present invention, the storage device included in each printing material container further includes an address counter that increments a count thereon synchronously with the clock signal input via the clock signal line to specify a position in the storage area of the storage element to be accessed, and resets the count to an initial value at a time of initialization. The input-output controller sets the direction of data transfer with regard to the storage element to a reading direction and prohibits data transfer with regard to the data bus as initial settings, and maintains the initial settings until the command decoder completes the analysis of the write/read command.

The writing/reading operation of data into and from the storage element is prohibited until completion of the analysis of the write/read command. This arrangement enables data to be written or read from a predetermined position in the storage element.

In one preferable embodiment of the storage system according to the seventh application of the present invention, the control unit causes the reset signal generation circuit to output the reset signal to the reset signal line. The control unit then causes the data output circuit to transmit the data array including the identification information, which is assigned to the storage device included in the desired printing material container to be accessed, and the write/read command to the data signal line synchronously with the clock signal, so as to gain access to the storage device in the desired printing material container.

In another preferable embodiment of the storage system according to the seventh application of the present invention, the storage device included in each printing material container causes the address counter to reset the count thereon to the initial value in response to detection of the reset signal. The storage device then causes the comparator to compare the identification information transmitted to the data bus with the identification information stored in the storage element to determine coincidence or incoincidence of the two pieces of identification information. When the result of the determination by the comparator represents coincidence of the identification information transmitted to the data bus with the identification information stored in the storage element, the storage device causes the command decoder to analyze the write/read command transmitted to the data bus, controls the data transfer with regard to the data bus and the data transfer with regard to the storage element based on the result of the analysis, and carries out either one of an operation of writing data at a desired position in the storage element and an operation of reading data from the storage element. This arrangement enables the writing/reading operation into and from the storage element to be controlled by the reset signal.

In the storage system according to the seventh application of the present invention, the identification information output circuit of the control unit may output common identification information common to all the storage devices, and the comparator of each storage device may store the common identification information therein. This arrangement ensures selection of all the printing material containers as the desired printing material containers to be accessed. When there is any data to be commonly written into the storage devices of all the printing material containers, this arrangement enables data to be written simultaneously into all the storage devices and thus desirably shortens the time period required for the writing operation.

In accordance with one preferable embodiment of the storage system according to the seventh application of the present invention, the control unit further comprises a power supply compensation circuit that gives compensational power supply for a predetermined time period after cutoff of general power supply. The reset signal generation circuit included in the control unit generates the reset signal on at least either one of an occasion of starting power supply to the control unit and an occasion of cutoff of the power supply. In response to detection of the reset signal during a writing operation of data, the data output circuit included in the control unit immediately terminates transmission of the data and instantly transmits preferential data to be completely written in the predetermined time period when the power supply compensation circuit gives the compensational power supply.

Even in the case of accidental cutoff of the power supply, this arrangement enables the preferential data, for example, data on the quantity of consumption of ink used as the printing material or on the remaining quantity of ink, to be completely written in the storage element.

In the storage system according to the seventh application of the present invention, it is preferable that the clock signal generation circuit included in the control unit lengthens a cycle of the clock signal in the case of output of a write command via the data output circuit than a cycle in the case of output of a read command. This arrangement ensures a sufficient time period for the writing operation of data, while shortening the access time to the storage device.

In one preferable embodiment of the seventh application of the present invention, the storage system further includes a module substrate that has the plurality of storage devices mounted thereon and a storage device detection signal line laid thereon to give cascade connection with each storage device and have one grounded end and the other end connecting with the control unit. The control unit further has a storage device detection circuit that determines whether or not all the storage devices are properly mounted on the module substrate, based on a value of the storage device detection signal line.

The embodiment detects proper or improper attachment of the printing material containers to the module substrate. This arrangement is adopted, for example, to determine whether or not ink cartridges for an ink jet printer, which respectively have the storage devices, are properly attached to an ink cartridge holder.

In the storage system according to the seventh application of the present invention, it is preferable that the storage device detection circuit included in the control unit determines that all the storage devices are mounted properly on the module substrate when the storage device detection signal line shows a ground voltage.

In the storage system according to the seventh application of the present invention, it is also preferable the storage device detection circuit included in the control unit determines that at least one storage device is not properly mounted on the module substrate when the storage device detection signal line shows a voltage other than a ground voltage.

In the storage system according to the seventh application of the present invention, the storage device may store a diversity of data regarding a type of the printing material accommodated in each printing material container. This arrangement enables a proper piece of information to be written into a specific ink cartridge selected among a plurality of ink cartridges set in a printer. It is also preferable that power supply to each storage device is allowed only when the control unit carries out a writing/reading operation of data into and from the storage device. This arrangement ensures the power supply to the storage device according to the requirements.

In the storage system according to the seventh application of the present invention, it is further preferable that the storage element included in each storage device has a specific section between a head position and a predetermined position of the storage area, the specific section being subjected to a writing operation under a predetermined condition and otherwise storing the identification information in an unrewritable manner. This arrangement enables the specific section between the head position and the predetermined position to be used as a read only area. In the storage system according to the seventh application of the present invention, the clock signal line, the data signal line, and the reset signal line may be included in a flexible cable. In this arrangement, the bus connection can reduce the number of signal lines in the flexible cable, and thus an affection of an elastic forces caused by the flexible cable can be prevented or reduced.

In eighth application of the present invention is a method of gaining access to a storage device attached to a desired printing material container among a plurality of printing material containers, wherein each printing material container has a non-volatile storage device that connects with a clock signal line, a data signal line, and a reset signal line via a bus and stores proper identification information therein. The method in the eighth application of the present invention includes the steps of: outputting a reset signal to the reset signal line; and transmitting a data array including identification information, which is assigned to the storage device included in the desired printing material container to be accessed, and a write/read command to the data signal line synchronously with a clock signal.

The method in the eighth application of the present invention enables selection of a desired printing material container without any exclusive signal line for the selection, since the proper identification information is stored in the storage device.

The present invention is also directed as its ninth application to a method of processing an access requirement in a storage device attached to a printing material container. The printing material container has a storage device including a storage element, which has a storage area sequentially accessed and a specific section between a head position and a predetermined position of the storage area to store identification information therein. The storage device shares a clock bus that is connected to a clock signal line, a data bus that is connected to a data signal line, and a reset bus that is connected to a reset signal line with a storage device included in another printing material container. The method in the ninth application of the present invention includes the steps of: resetting a count on an address counter to an initial value in response to detection of a reset signal on the reset bus; comparing identification information transmitted to the data bus with the identification information stored in the storage element to determine coincidence or incoincidence of the two pieces of identification information; when the result of the determination represents coincidence of the identification information transmitted to the data bus with the identification information stored in the storage element, analyzing a write/read command transmitted to the data bus; controlling data transfer with regard to the data bus and data transfer with regard to the storage element based on the result of the analysis; and carrying out either one of an operation of writing data at a desired position in the storage element and an operation of reading data from the storage element, based on the count on the address counter.

The method in the ninth application of the present invention enables selection of a desired printing material container without any exclusive signal line for the selection, since the proper identification information is stored in the storage element of the storage device.

In a printing material container having a non-volatile storage device, which includes a storage element sequentially accessed, a tenth application of the present invention is a method of storing identification information in a specific section located between a head position and a predetermined position of a storage area in the storage element. The method in the tenth application of the present invention includes the steps of: resetting a count on an address counter to an initial value and prohibiting increment of the count synchronously with a clock signal, in response to detection of a reset signal; setting a direction of data transfer with regard to a data bus to a writing direction and a direction of data transfer with regard to the storage element to a writing direction, in response to a write command transmitted to the data bus; allowing increment of the count on the address counter synchronously with the clock signal after completion of the settings of the directions of data transfer; and writing the identification information between the head position and the predetermined position of the storage area in the storage element and subsequently writing data into the storage area according to the count on the address counter.

This arrangement enables identification information and other data to be written in the test mode. The identification information can be written from the head position of the storage area.

In a printing material container having a non-volatile storage device, which includes a storage element sequentially accessed, an eleventh application of the present invention is a method of reading data stored in a storage area of the storage element from a head position of the storage area. The method in the eleventh application of the present invention includes the steps of: resetting a count on an address counter to an initial value and prohibiting increment of the count synchronously with a clock signal, in response to detection of a reset signal; setting a direction of data transfer with regard to a data bus to a reading direction and a direction of data transfer with regard to the storage element to a reading direction, in response to a read command transmitted to the data bus; allowing increment of the count on the address counter synchronously with the clock signal after completion of the settings of the directions of data transfer; and reading data stored in the storage area of the storage element from the head position of the storage area according to the count on the address counter. This arrangement enables data to be read out in the test mode.

In a printing material container having a non-volatile storage device, which includes a storage element sequentially accessed, a twelfth application of the present invention is a method of storing identification information in a specific section located between a head position and a predetermined position of a storage area in the storage element. The method in the twelfth application of the present invention includes the steps of: carrying out retrieval to find a piece of identification information that coincides with the identification information stored in the storage element of the storage device; when the piece of identification information that coincides with the identification information stored in the storage element is found, transmitting the piece of identification information and a write command to the storage device; transmitting a data array to the storage device, the data array including the identification information after data corresponding to an end position of the storage area in the storage element of the storage device; and writing data up to the end position of the storage area in the storage element and subsequently writing the identification information from the head position to the predetermined position of the storage area in the storage element, according to a count on an address counter.

Even when the identification information stored in the storage device attached to the printing material container is unknown, the method according to the twelfth application of the present invention enables the identification information stored in the storage device to be found and written in the specific section between the head position and the predetermined position of the storage area in the storage element. In the case of recycle of the printing material container, this arrangement enables new pieces of identification information and data to be readily written into the storage device. This enhances the recycle of the storage device.

Any of the methods according to the eighth to the twelfth applications of the present invention discussed above may be applied to a set of printing material containers, each having a storage device that stores a different piece of identification information therein.

The methods according to the eighth to the twelfth applications of the present invention discussed above may be applied to the storage device, instead of the printing material container. Such application ensures the same functions and effects.

The present invention is also directed as its thirteenth application to a non-volatile storage device that connects with a clock signal line, a data signal line, and a reset signal line and is initialized in response to a reset signal input via the reset signal line. The storage device in the thirteenth application of the present invention includes a storage element, which has a storage area sequentially accessed and a specific section between a head position and a predetermined position of the storage area. The specific section is subjected to a writing operation under a predetermined condition and otherwise stores identification information in an unrewritable manner.

In the storage device according to the thirteenth application of the present invention, the storage element has the specific section that is subjected to a writing operation under a predetermined condition and otherwise stores identification information in an unrewritable manner. This arrangement enables selection of a desired storage device without any exclusive signal line for the selection. The identification information is stored in the unrewritable manner. The writing operation is, however, allowed under the predetermined condition in the specific section where the identification information is stored. The identification information can thus be rewritten easily.

The present invention provides a printing material container detachably attached to a printing apparatus. The printing material container comprises a reservoir unit that keeps a printing material therein, and a storage element. The storage element has a storage area of an identification information, and a writable data area, in which data are writable, after the storage area of the identification information. Data regarding at least a quantity of the printing material may be written into the writable data area. This arrangement is applicable to not only a three signal line system but also a two signal line system.

DESCRIPTION OF THE PREFERRED EMBODIMENTS

Some embodiments of the present invention constructed as storage systems including storage devices according to the present invention are discussed below in the following sequence by referring to drawings:

A. Configuration of Storage System in First Embodiment

B. Structure of Storage Device in First Embodiment

C. Operations of Storage System in First Embodiment

Figure 1:
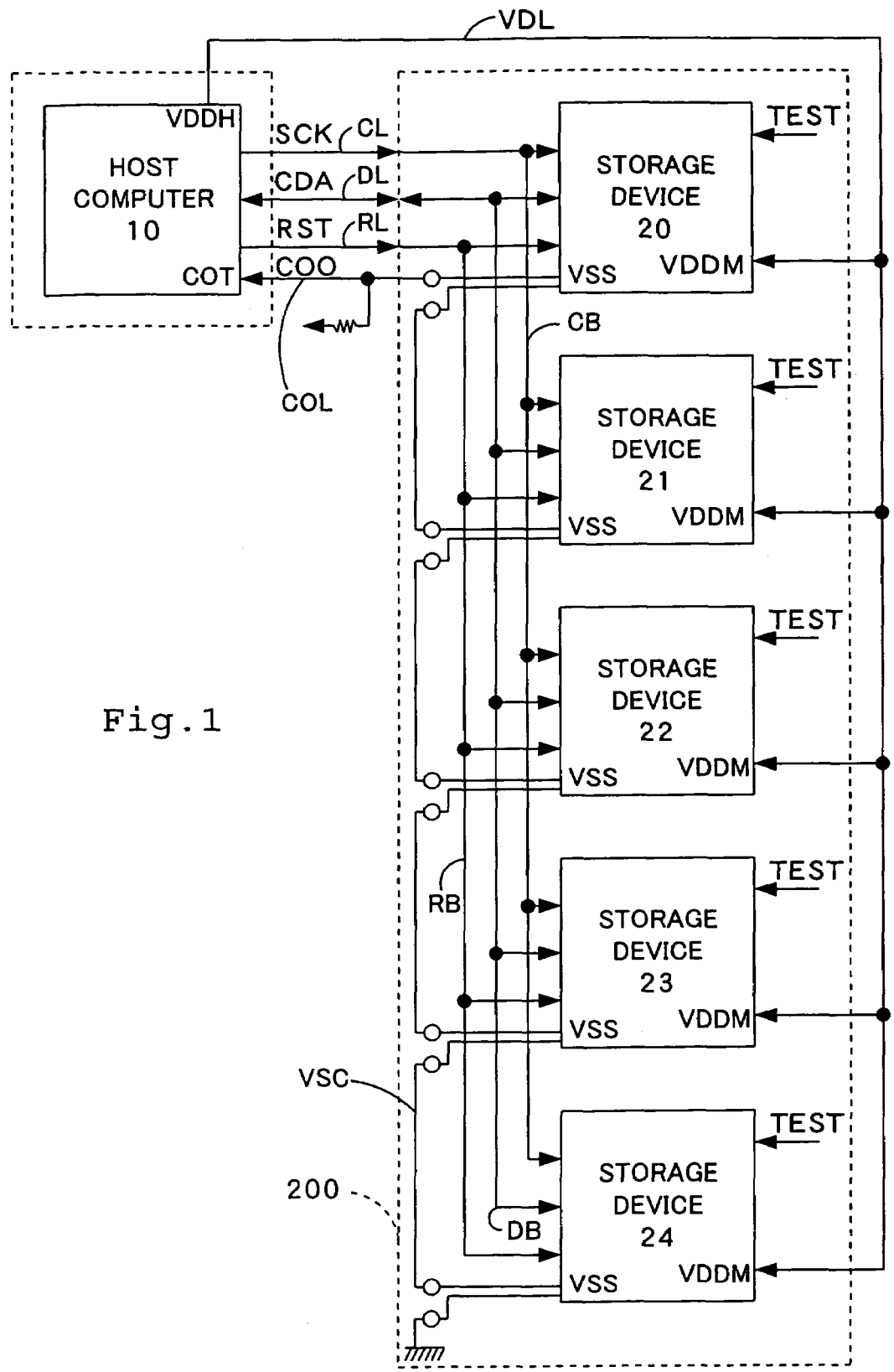
FIG. 1 illustrates the configuration of a storage system including a plurality of storage devices and a host computer in a first embodiment of the present invention.

D. Configuration of Storage System and Structure of Storage Device in Second Embodiment E. Process of Writing Identification Data into Storage Device in Test Mode (in factory Setting Process) in Third Embodiment F. Process of Writing Identification Data into Storage Device in Test Mode (in factory Setting Process) in Fourth Embodiment A. Configuration of Storage System in First Embodiment The schematic structure of a storage system in a first embodiment of the present invention is discussed below with reference to FIG. 1. FIG. 1 illustrates the configuration of a storage system including a plurality of storage devices and a host computer in the first embodiment of the present invention.

Figure 15:
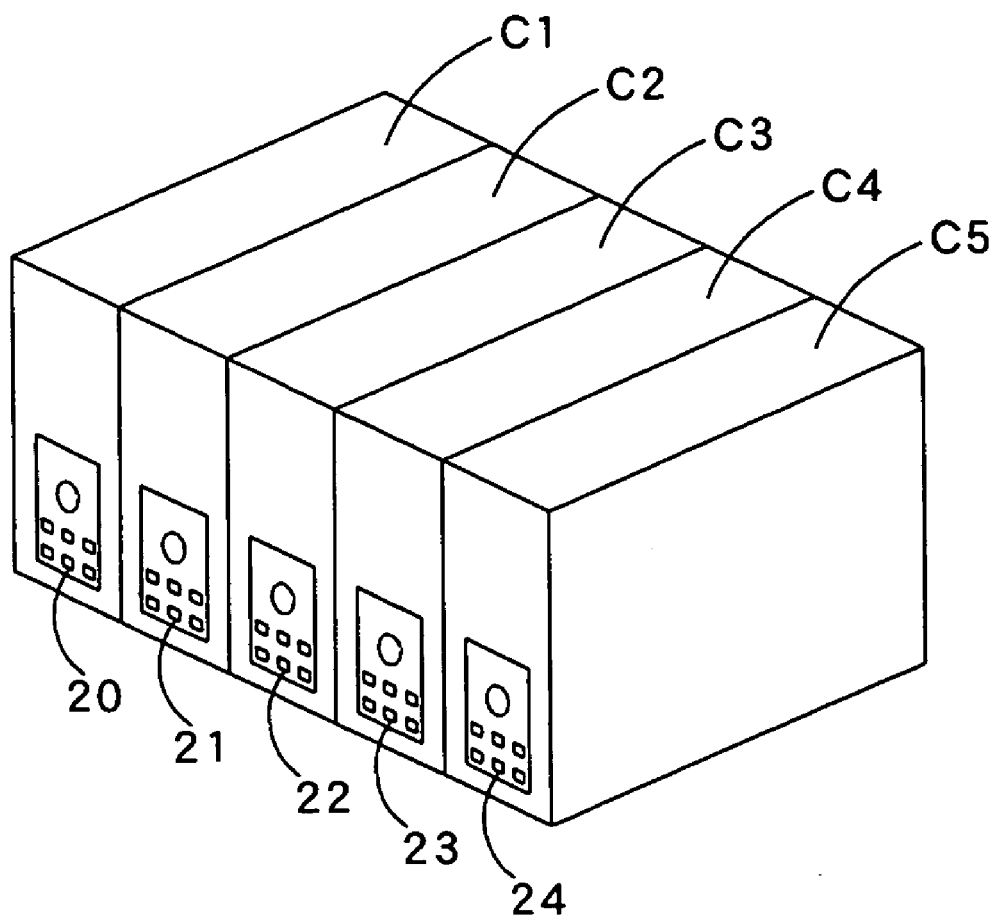
FIG. 15 shows one application of the storage devices to ink cartridges.

The storage system of this embodiment includes a host computer 10 and five storage devices 20, 21, 22, 23, and 24, which are mounted on a memory module substrate 200 and are under access control of the host computer 10. The storage devices 20, 21, 22, 23, and 24 are respectively provided in five color ink cartridges C1, C2, C3, C4, and C5 for an ink jet printer as shown in FIG. 15. The five color ink cartridges C1, C2, C3, C4, and C5 keep five different color inks therein; for example, cyan, light cyan, magenta, light magenta, and yellow. An EEPROM that keeps the contents of storage in a non-volatile manner and makes the contents of storage rewritable is applied for each of the storage devices in this embodiment.

Although only the storage devices 20, 21, 22, 23, and 24 are illustrated in FIG. 1 for the simplicity of explanation, the storage devices 20, 21, 22, 23, and 24 of this embodiment are actually incorporated in the ink cartridges C1, C2, C3, C4, and C5 as mentioned previously.

Figure 4:
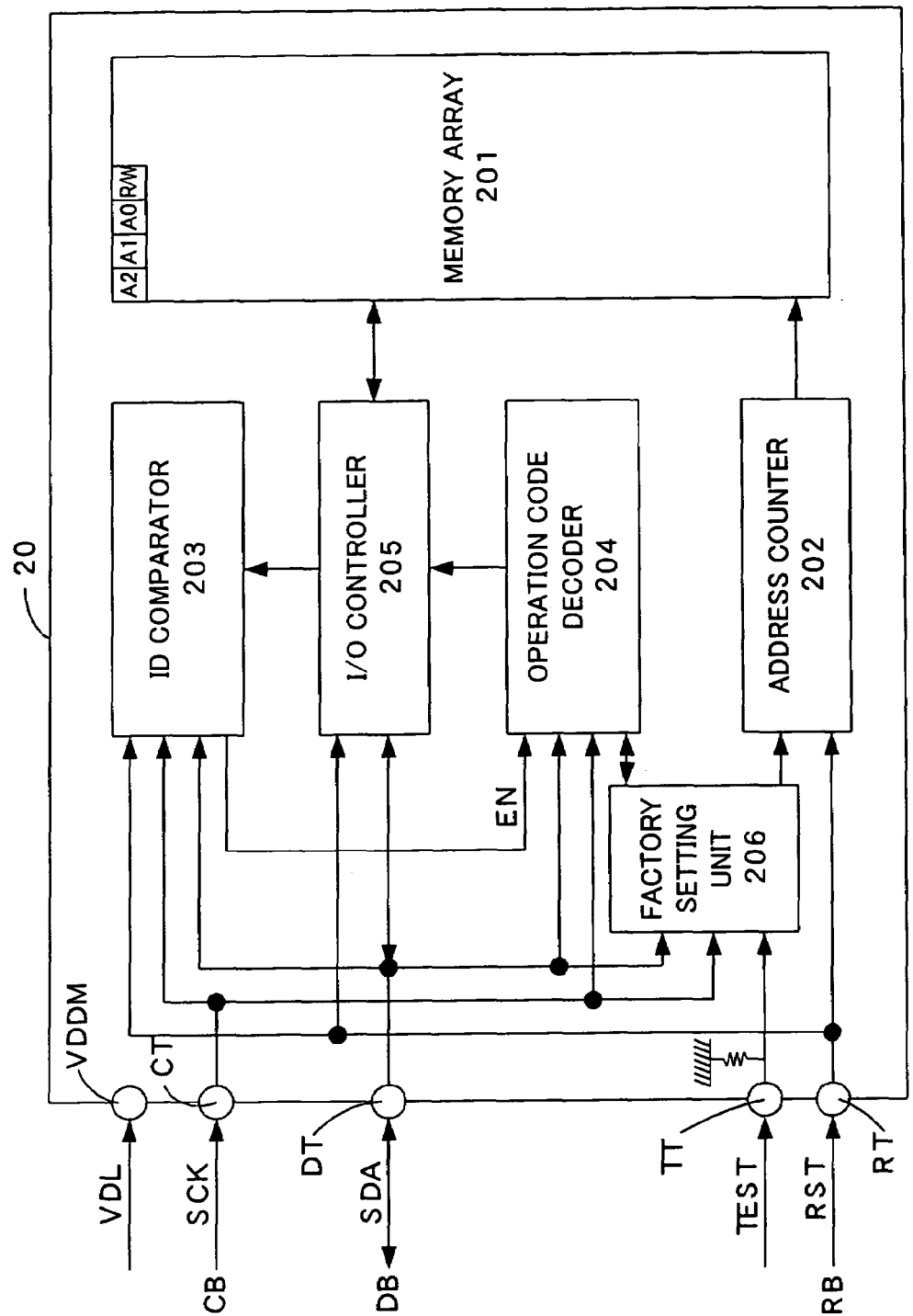
FIG. 4 is a block diagram illustrating the internal circuit structure of the storage device in the first embodiment.

Data signal terminals DT, clock signal terminals CT, and reset signal terminals RT of the storage devices 20, 21, 22, 23, and 24 are connected respectively via a data bus DB, a clock bus CB, and a reset bus RB (see FIG. 4). The host computer 10 is connected with the data bus DB, the clock bus CB, and the reset bus RB via a data signal line DL, a clock signal line CL, and a reset signal line RL, respectively. These signal lines may be actualized by, for example, a flexible feed cable (FFC). A power supply positive electrode terminal VDDH of the host computer 10 is connected to power supply positive electrode terminals VDDM of the respective storage devices 20, 21, 22, 23, and 24 via a power supply line VDL. A power supply negative electrode signal line VSL is laid on the memory module substrate 200 to serially connect power supply negative electrode terminals VSS of the respective storage devices 20, 21, 22, 23, and 24. One end of the power supply negative electrode signal line VSL is grounded, whereas the other end is connected to a cartridge out detection terminal COT of the host computer 10 via a cartridge out signal line COL.

The host computer 10 is a controller including a clock signal generation circuit, a reset signal generation circuit, a power supply monitor circuit, a power supply circuit, a power supply compensation circuit, a data storage circuit, and a control circuit for controlling the preceding circuits (not shown). The host computer 10 controls access to the storage devices 20, 21, 22, 23, and 24. The host computer 10, which is incorporated in, for example, the main body of the ink jet printer, obtains data regarding the quantity of ink consumption and the attachment time of each ink cartridge and stores such data in the data storage circuit.

The control circuit of the host computer 10 gains access to the storage devices 20, 21, 22, 23, and 24 at the time of power supply to the ink jet printer, on the occasion of replacement of an ink cartridge, at the time of completing a print job, and at the time of cutting off the power supply to the ink jet printer. When gaining access to the storage devices 20, 21, 22, 23, and 24, the control circuit of the host computer 10 requires the reset signal generation circuit to generate a reset signal RST. This arrangement ensures generation of the reset signal RST even in the case of blackout or an accidental pullout of a power plug. The power supply compensation circuit of the host computer 10 ensures additional power supply for a predetermined time period (for example, 0.3 seconds) in the case of cutoff of the power supply. Even when the power supply is suddenly cut off, for example, due to blackout or the accidental pullout of the power plug, in the course of writing data, such compensation enables writing of preferential data to be completed in the predetermined time period. A capacitor is, for example, applied for the power supply compensation circuit.

The control circuit of the host computer 10 controls the power supply circuit to regulate the output of positive power supply. The host computer 10 of this embodiment does not continuously supply the power to the respective storage devices 20, 21, 22, 23, and 24 but supplies the positive power to the storage devices 20, 21, 22, 23, and 24 only in response to requirement of access to the storage devices 20, 21, 22, 23, and 24.

Figure 2:
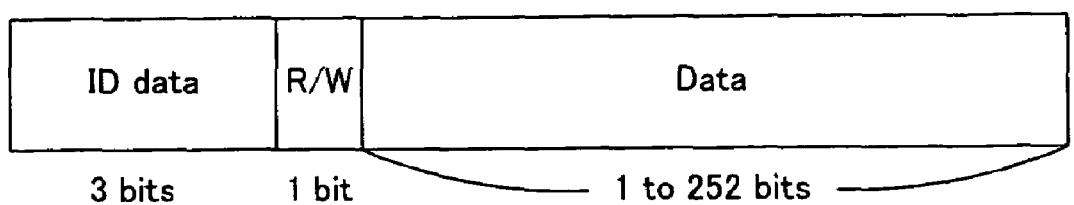
FIG. 2 shows a data array transmitted from the host computer in a normal mode as an example.
Figure 3:
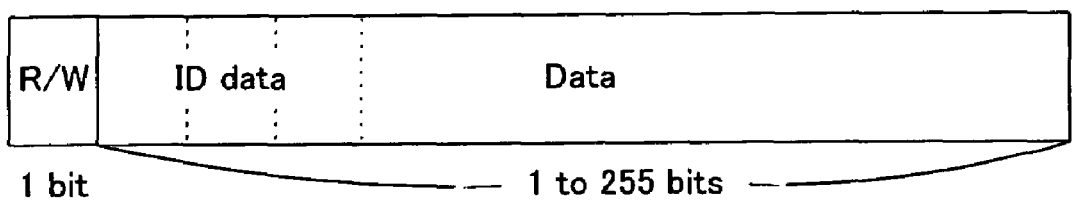
FIG. 3 shows a data array transmitted from the host computer in a test mode as an example.

Data arrays transmitted from the host computer 10 are discussed with referring to FIGS. 2 and 3. FIG. 2 shows a data array transmitted from the host computer 10 in a normal mode as an example. FIG. 3 shows a data array transmitted from the host computer 10 in a test mode as an example.

The data array transmitted from the host computer 10 in the normal mode includes a 3-bit identification data section, a 1-bit write/read command section, and a 1-bit to 252-bit write/read data section as shown in FIG. 2. The data array transmitted from the host computer 10 in the test mode section includes a 1-bit write/read command section and a 1-bit to 255-bit write data section as shown in FIG. 3. The first 3 bits from the head of the write data section are allocated to the identification data.

The clock signal generation circuit of the host computer 10 generates a clock signal SCK, for example, at intervals of 4 μs in the case of reading data from the storage devices 20, 21, 22, and 23 and at intervals of 3 ms in the case of writing data into the storage devices 20, 21, 22, and 23.

B. Structure of Storage Device in First Embodiment

The internal structure of each of the storage devices 20, 21, 22, 23, and 24 is discussed below with referring to FIG. 4. FIG. 4 is a block diagram illustrating the internal circuit structure of the storage device 20. The storage devices 20, 21, 22, 23, and 24 have identical internal structures, except identification data (identification information) and proper data stored therein. The following description thus regards the internal structure of the storage device 20 as a typical example.

The storage device 20 includes a memory array 201, an address counter 202, an ID comparator 203, an operation code decoder 204, an I/O controller 205, and a factory setting unit 206.

The memory array 201 has a storage area of a preset capacity, for example 256 bits. The storage area of 3 bits from the head is assigned to identification data, and the $4^{th}$ bit from the head is set as an invalid storage area. As mentioned above, the identification data is registered in the first 3 bits from the head of the data array transmitted from the host computer 10 in the normal mode. The $4^{th}$ bit from the head is allocated to a write/read command. Data are accordingly written in the storage area at and after the $5^{th}$ bit from the head. Such structure of the storage area in the memory array 201 assigns the first 4 bits to a read only storage area. In the memory array 201, the $5^{th}$ bit from the head starts the storage area in which preferential data, for example, the quantity of ink consumption or the remaining quantity of ink, is written. Even in the case where the power supply is accidentally cut off by some cause other than a normal operation of a power switch, this arrangement enables the preferential data to be completely written into the memory array 201 in the predetermined time period when the power supply compensation circuit gives the compensational power supply.

The address counter 202 is connected with the memory array 201 and increments its count synchronously with the clock signal SCK supplied via the factory setting unit 206. The count is related to the position (address) in the storage area of the memory array 201. The writing position or the reading position in the memory array 201 may be specified by the count on the address counter 202. The address counter 202 is also connected to the reset signal terminal RT and resets its count to an initial value in response to input of the reset signal RST. The initial value may be any value related to the head position of the memory array 201, and is generally set equal to 0.

The ID comparator 203 is connected with the clock signal terminal CT, the data signal terminal DT, and the reset signal terminal RT and compares the identification data included in the data array input via the data signal terminal DT with the identification data stored in the memory array 201 to determine coincidence or incoincidence thereof. In accordance with a concrete procedure, the ID comparator 203 obtains the 3-bit identification data input after the reset signal RST. The ID comparator 203 has a 3-bit register (not shown) for storing the identification data included in the data array and another 3-bit register (not shown) for storing the identification data obtained from the memory array 201 via the I/D controller 205. Coincidence or incoincidence of the two identification data is determined, based on the coincidence or incoincidence of the values in the two 3-bit registers. In the case of coincidence of the two identification data, the ID comparator 203 transmits an access enable signal EN to the operation code decoder 204. The ID comparator 203 clears the values in the registers in response to input of the reset signal RST. Common identification data, for example, (1,1,1) in this embodiment, is stored in the ID comparators 203 of all the storage devices 20, 21, 22, 23, and 24. The presence of the common identification data in the ID comparators of all the storage devices 20, 21, 22, 23, and 24 enables common data to be simultaneously written into the respective storage devices 20, 21, 22, 23, and 24.

The operation code decoder 204 is connected with the I/O controller 205, the clock signal terminal CT, and the data signal terminal DT and acquires the write/read command input as the $4^{th}$ bit data after the reset signal RST. In response to input of the access enable signal EN, the operation code decoder 204 analyzes the acquired write/read command and outputs a writing requirement or a reading requirement to the I/O controller 205. The operation code decoder 204 is also connected with the factory setting unit 206 and transmits an analysis termination notice to the factory setting unit 206 on completion of analysis of the write/read command in the test mode.

The I/O controller 205 is connected with the data signal terminal DT and the memory array 201 and changes over the direction of data transfer with regard to the memory array 201 and the direction of data transfer with regard to the data signal terminal DT (that is, the direction of data transfer on the signal line connecting with the data signal terminal DT). The I/O controller 205 is also connected with the reset signal terminal RT and receives the reset signal RST. The I/O controller 205 has a first buffer memory (not shown) for temporarily storing data read from the memory array 201 and data to be written into the memory array 201, as well as a second buffer memory (not shown) for temporarily storing data transmitted from the data bus DB and data to be transmitted to the data bus DB.

The I/O controller 205 is initialized by the input of the reset signal RST. At the time of initialization, the I/O controller 205 sets the direction of data transfer with regard to the memory array 201 to the reading direction and outputs a high impedance to the signal line connecting with the data signal terminal DT, so as to prohibit the data transfer with regard to the data signal terminal DT. The state of the initialization is maintained until input of a writing requirement or a reading requirement from the operation code decoder 204. The first 4-bit data in the data array input via the data signal terminal DT after the reset signal RST is thus not written into the memory array 201. The data stored in the first 4 bits (invalid data at the $4^{th}$ bit) of the memory array 201 is, on the other hand, transmitted to the ID comparator 203. The first 4 bits in the memory array 201 is accordingly set in the read only state.

The factory setting unit 206 is connected with a test signal terminal TT, the clock signal terminal CT, and the data signal terminal DT, and carries out a predetermined series of processing in the test mode in response to input of a test signal. The factory setting unit 206 transfers the input clock signal SCK to the address counter 202 in the case of no input of the test signal. In the case of input of the test signal, on the other hand, the factory setting unit 206 does not transfer the input clock signal SCK to the address counter 202 until receiving the analysis termination notice sent from the operation code decoder 204. The factory setting unit 206 sends a test mode command to the operation code decoder 204. A pull-down resistance is connected to the test signal terminal TT, which is set in the inactive state in the normal mode.

C. Operations of Storage System in First Embodiment

Figure 5:
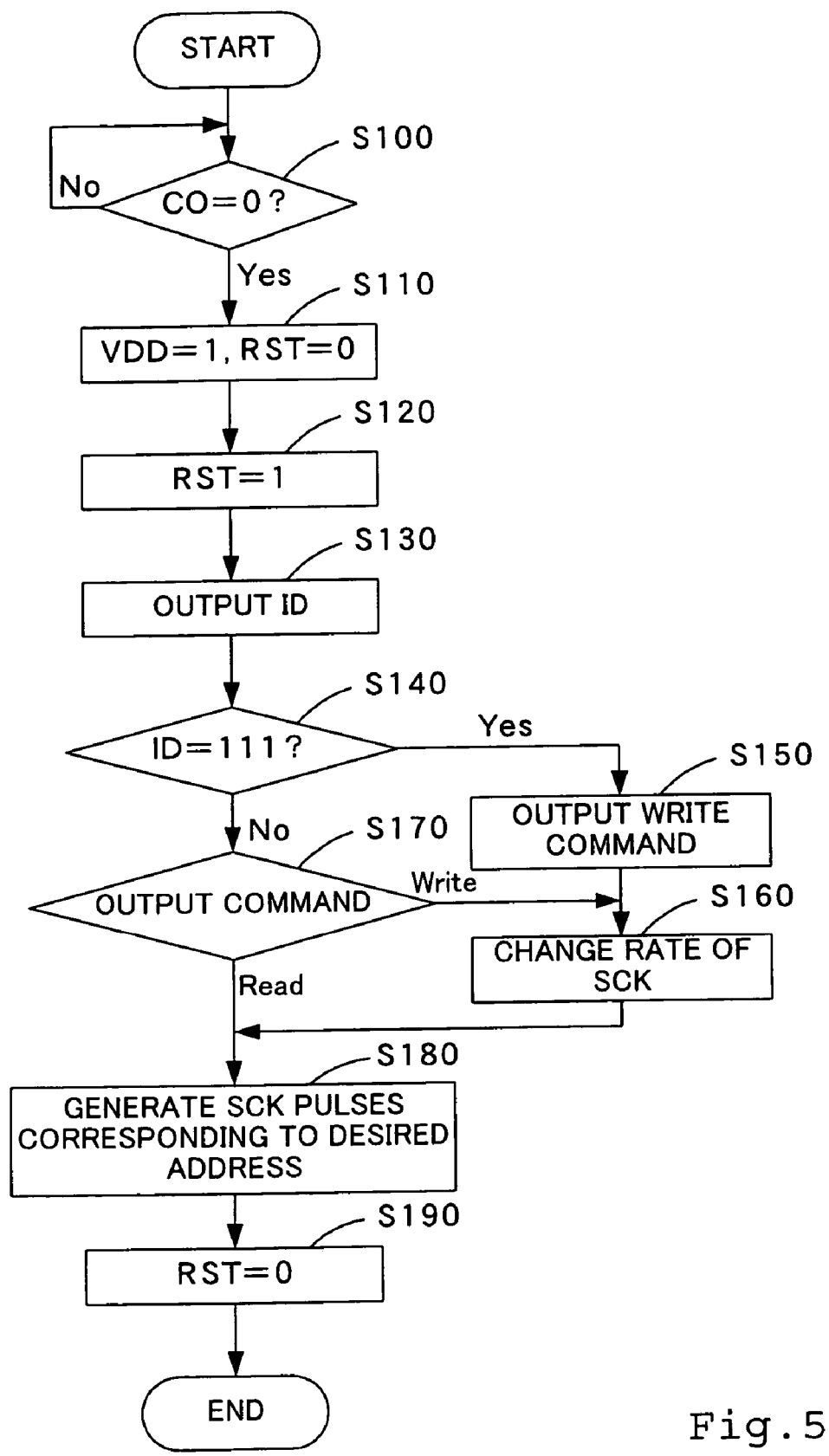
FIG. 5 is a flowchart showing a processing routine executed by the host computer, which gains access to the storage devices.
Figure 6:
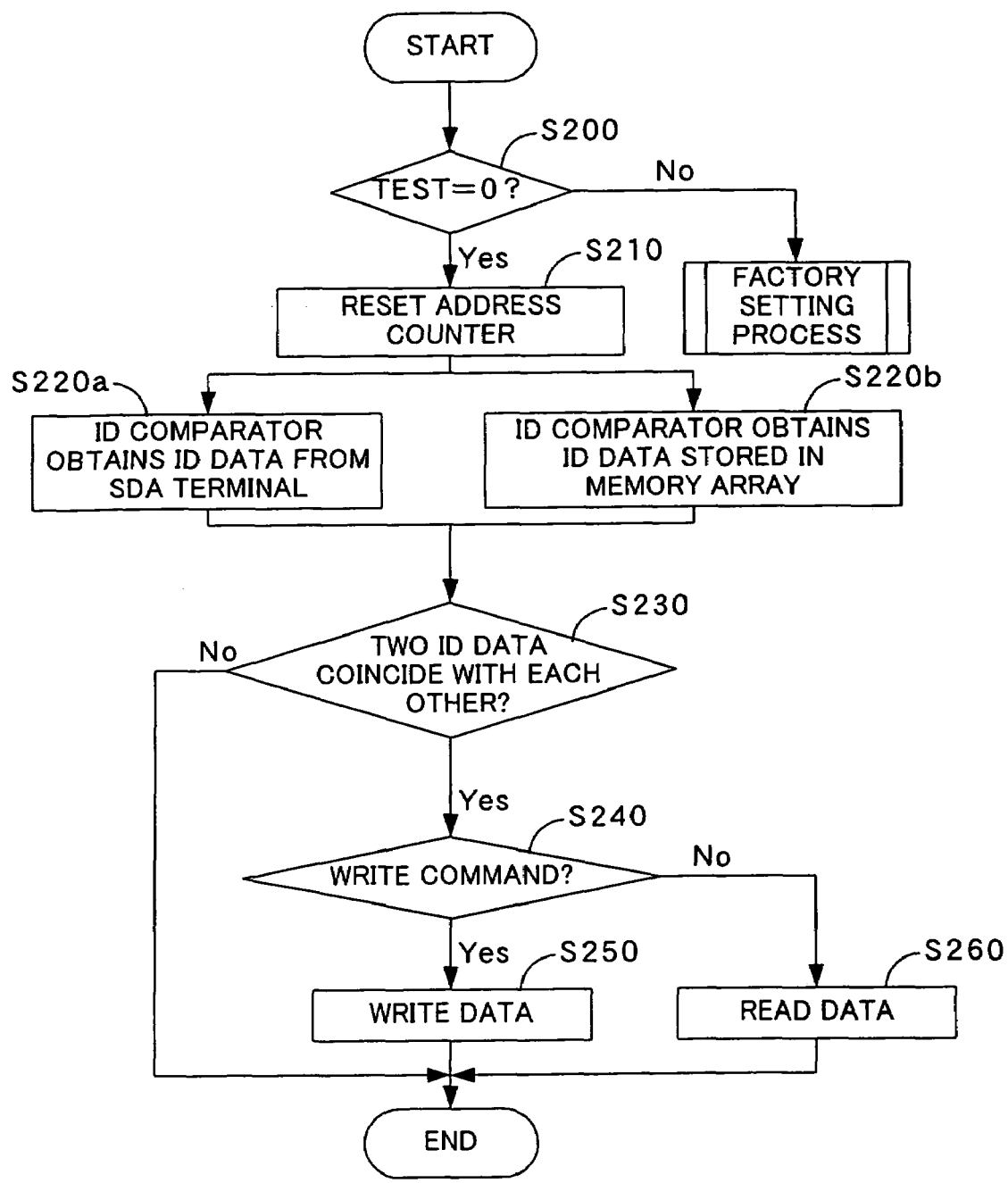
FIG. 6 is a flowchart showing a processing routine executed by the respective circuit structures of the storage devices when being accessed by the host computer.
Figure 7:
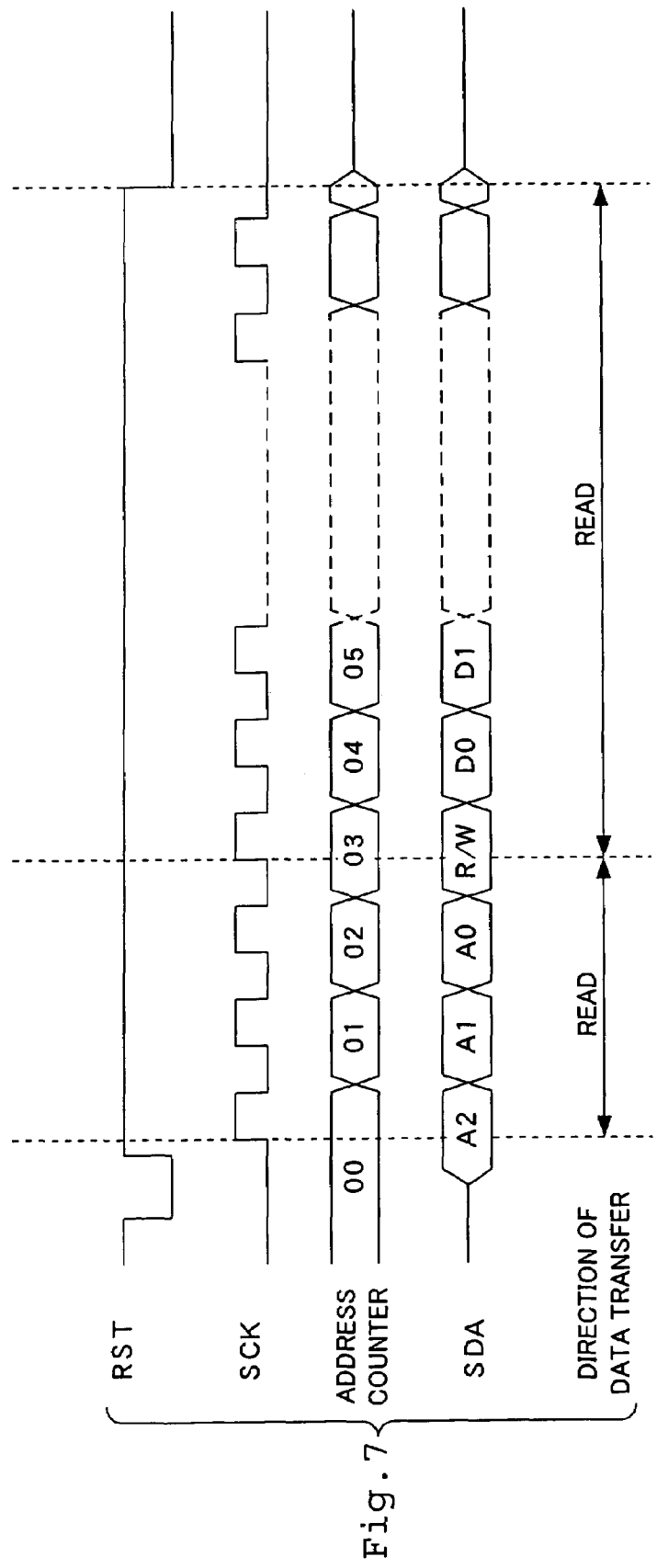
FIG. 7 is a timing chart showing a time-based relationship among the reset signal RST, the clock signal SCK, the data signal SDA, and the count on the address counter at the time of reading data.
Figure 8:
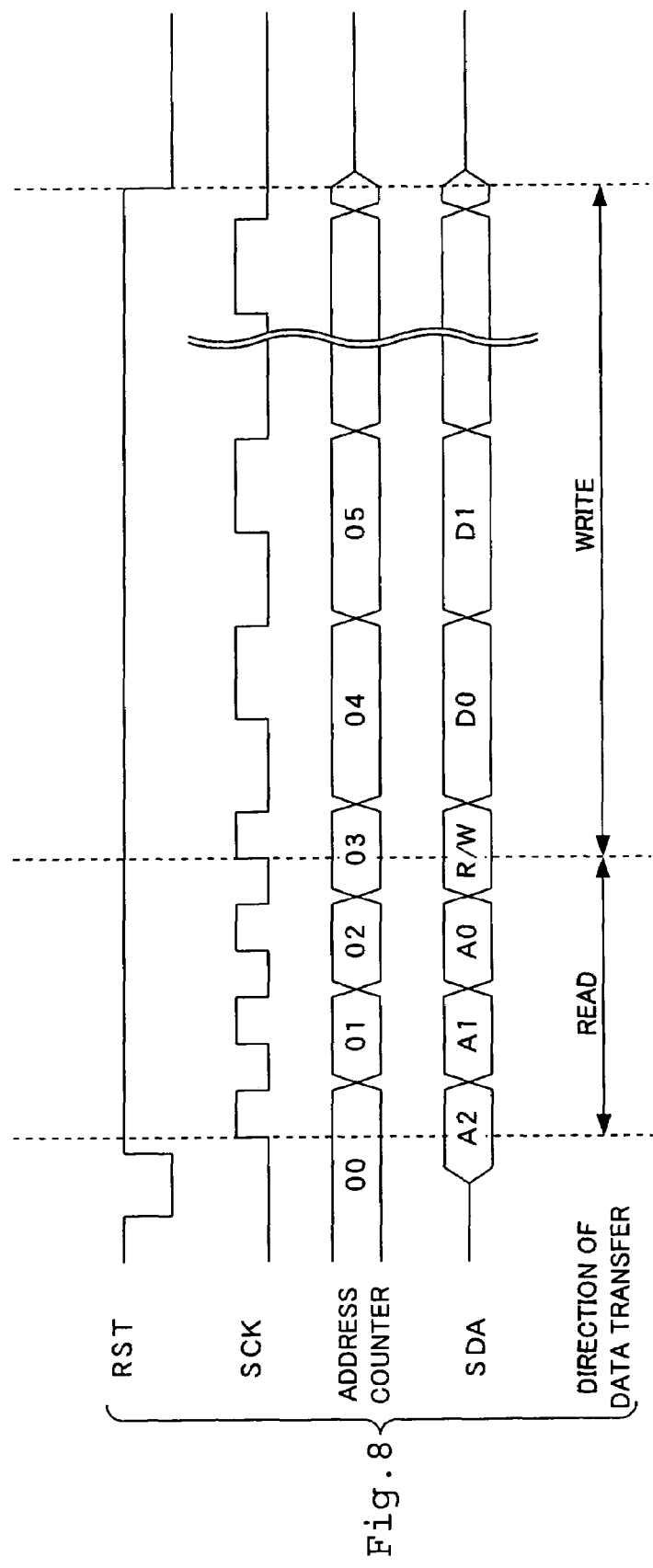
FIG. 8 is a timing chart showing a time-based relationship among the reset signal RST, the clock signal SCK, the data signal SDA, and the count on the address counter at the time of writing data.

The following describes the operations of the storage system in this embodiment with referring to FIGS. 5 through 8. FIG. 5 is a flowchart showing a processing routine executed by the host computer 10, which gains access to the storage devices 20, 21, 22, 23, and 24. FIG. 6 is a flowchart showing a processing routine executed by the respective circuit structures of the storage devices 20, 21, 22, 23, and 24 when being accessed by the host computer 10. FIG. 7 is a timing chart showing a time-based relationship among the reset signal RST, the clock signal SCK, the data signal SDA, and the count on the address counter at the time of reading data. FIG. 8 is a timing chart showing a time-based relationship among the reset signal RST, the clock signal SCK, the data signal SDA, and the count on the address counter at the time of writing data.

The control circuit of the host computer 10 stands by until an input value CO of the cartridge out signal line COL is set equal to 0 at step S100 (as long as the decision point S100 gives negative answer). In the case where all ink cartridges are properly held in an ink cartridge holder, the power supply negative electrode signal line VSL is serially connected and grounded. In this case, the input value CO of the cartridge out signal line COL shows the ground voltage (for example, about 0 volt). In the event that even one ink cartridge is not properly held in the ink cartridge holder, on the other hand, the power supply negative electrode signal line VSL is not serially connected nor grounded. The value corresponding to the circuit voltage of the control circuit thus appears on the cartridge out signal line COL. The procedure of the embodiment carries out binarization on the basis of a predetermined threshold value, in order to eliminate adverse effects of noise. The input value CO of the cartridge out signal line COL is accordingly either 0 or 1.

When the input value CO of the cartridge out signal line COL is set equal to 0 (that is, in the case of affirmative answer at step S100), the control circuit of the host computer 10 supplies the power source voltage to the power supply positive electrode terminals VDDM of the storage devices 20, 21, 22, 23, and 24 via the power supply line VDL (VDD=1) causes the reset signal generation circuit to generate the reset signal RST at its low level (that is, to set RST=0), and transmits the reset signal RST=0 to the reset bus RB via the reset signal line RL at step S110 as shown in FIGS. 7 and 8. Unless all the ink cartridges are properly held in the ink cartridge holder, the power source voltage is not supplied to the storage devices 20, 21, 22, 23, and 24. The reset signal RST is active at its low level. The terminology 'to generate or input the reset signal RST' in the specification hereof represents generation or input of the reset signal RST in its low level, unless otherwise specified.

The control circuit of the host computer 10 subsequently causes the reset signal generation circuit to generate the reset signal RST at its high level (that is, to set RST=1) at step S120 as shown in FIGS. 7 and 8. The control circuit of the host computer 10 then outputs identification data (hereinafter may be referred to as ID data) of an ink cartridge to be accessed (corresponding to one of the storage devices 20, 21, 22, 23, and 24) at step S130. The output ID data is transmitted to the data bus DB via the data signal line DL synchronously with rising edges of the clock signal SCK as shown in FIGS. 7 and 8. The control circuit of the host computer 10 compares the output ID data with (1,1,1) at step S140. As mentioned previously, (1,1,1) is the common identification data stored in advance in the ID comparators of all the storage devices 20, 21, 22, 23, and 24. In the case of the output ID data=(1,1,1), data can be written simultaneously into all the storage devices 20, 21, 22, 23, and 24.

When it is determined that the output ID data is equal to (1,1,1) (that is, in the case of affirmative answer at step S140), the control circuit of the host computer 10 outputs a write command at step S150. The output write command is transmitted to the data bus DB via the data signal line DL synchronously with a $4^{th}$ rising edge of the clock signal SCK after the switchover of the reset signal RST from the low level to the high level as shown in FIGS. 7 and 8. The control circuit of the host computer 10 subsequently requires the clock signal generation circuit to lower the rate of the clock signal SCK, that is, to extend the cycle of the clock signal SCK at step S160. The time period required for writing data into the EEPROM is, for example, about 3 ms, whereas the time period required for reading data from the EEPROM is, for example, about 4 μs. This means that the time period required for writing data is approximately 1000 times the time period required for reading. The procedure of this embodiment gains access to the storage devices 20, 21, 22, 23, and 24 at the higher clock signal rate until output of the write command. The procedure lowers the clock signal rate at the time of writing data. This arrangement advantageously shortens the access time while ensuring proper data writing.

When it is determined that the output ID data is not equal to (1,1,1) (that is, in the case of negative answer at step S140), on the other hand, the control circuit of the host computer 10 outputs either a read command or a write command at step S170. The output command is transmitted to the data bus DB via the data signal line DL. In the case of outputting the write command at step S170, the control circuit of the host computer 10 lowers the rate of the clock signal SCK at step S160. In the case of outputting the read command at step S170, on the contrary, the current rate of the clock signal SCK is kept unchanged.

The control circuit of the host computer 10 outputs a specific number of pulses of the clock signal SCK, which corresponds to a desired address (position) in the memory array 201 for data writing, at step S180. The storage device 20 of this embodiment is a sequential access type. The control circuit is thus required to output the number of pulses of the clock signal SCK corresponding to the desired address for data writing, and increments the count on the address counter 202 to a value corresponding to the desired address. The control circuit of the host computer 10 lastly causes the reset signal generation circuit to generate the reset signal RST at its low level (that is, to set RST=0) and transmits the reset signal RST=0 to the reset bus RB via the reset signal line RL, so as to terminate the access to the storage devices 20, 21, 22, 23, and 24 at step S190. The access is terminated by output of the reset signal RST=0 (that is, the reset low signal). The reset signal RST is also output in the case of cutoff of the power supply. Even when the power supply is suddenly cut off in the course of writing data, this arrangement enables the writing process to be normally concluded with regard to at least the data that have already been written.

The following describes a series of processing executed by the respective circuit structures of the storage devices 20, 21, 22, 23, and 24 when being accessed by the host computer 10, with reference to FIG. 6. The discussion regards the storage device 20 as a typical example.

The factory setting unit 206 of the storage device 20 first determines whether there is an input of the test signal (TEST=1) or no input (TEST=0) at step S200. When the factory setting unit 206 determines that there is an input of the test signal (that is, in the case of negative answer at step S200), a factory setting process discussed later is carried out.

When the factory setting unit 206 determines that there is no input of the test signal (that is, in the case of affirmative answer at step S200), the respective constituents of the storage unit 20 are actuated and operated in response to the diverse signals sent from the host computer 10. The operations of the storage device 20 at the output timings of the signals from the host computer 10 are discussed below with referring to FIGS. 7 and 8.

In response to input of the reset low signal to the reset bus RB, the address counter 202 resets its count to the initial value (0) at step S210. The ID comparator 203 and the I/O controller 205 are also initialized. In accordance with a concrete procedure, the ID comparator 203 clears its two internal registers. The I/O controller 205 sets the direction of data transfer with regard to the memory array 201 to the reading direction and outputs the high impedance to the signal line connecting with the data signal terminal DT to prohibit the data transfer.

As described previously, the host computer 10 transmits a diversity of data synchronously with rising edges of the clock signal SCK after the switchover of the reset signal RST from the low level to the high level. The address counter 202 increments its count one by one from the initial value synchronously with rising edges of the clock signal SCK after the switchover of the reset signal RST from the low level to the high level.

The ID comparator 203 obtains 3-bit ID data, that is, data transmitted to the data bus DB synchronously with three rising edges of the clock signal SCK after the switchover of the reset signal RST from the low level to the high level, and stores the 3-bit ID data into the first 3-bit register at step S220a. Simultaneously the ID comparator 203 obtains 3-bit ID data stored in the memory array 201, that is, data at specific addresses of the memory array 201 specified by counts '00', '01', and '02' on the address counter 202, and stores the ID data into the second 3-bit register at step S220b.

The ID comparator 203 then compares the 3-bit ID data stored in the first register with the 3-bit ID data stored in the second register at step S230 to determine coincidence or incoincidence thereof. The ID comparator 203 also compares the common ID data stored in advance with the ID data stored in the first register to determine coincidence or incoincidence thereof. When the ID comparator 203 determines incoincidence of the ID data (that is, in the case of negative answer at step S230), the host computer 10 is not allowed to access the memory array 201. This concludes the series of processing to gain access to the storage device 20. In this case, access is allowed to one of the other storage devices 21, 22, 23, and 24.

In the case of coincidence of the ID data (that is, in the case of affirmative answer at step S230), the ID comparator 203 transmits the access enable signal EN to the operation code decoder 204. In this case, the host computer 10 is allowed to access the memory array 201 of only the storage device 20 among the plurality of storage devices 20, 21, 22, 23, and 24. In the case of the ID data=(1,1,1), the host computer 10 is allowed to access the memory arrays 201 of all the storage devices 20, 21, 22, 23, and 24. The operation code decoder 204 receiving the access enable signal EN obtains a write/read command, which is transmitted to the data bus DB synchronously with the $4^{th}$ rising edge of the clock signal SCK after the switchover of the reset signal RST from the low level to the high level, and determines whether the obtained command is the write command or the read command at step S240.

In the case of the write command (that is, in the case of affirmative answer at step S240), the operation code decoder 204 transmits the write command to the I/O controller 205. The I/O controller 205 receiving the write command changes the direction of data transfer with regard to the memory array 201 to the writing direction and cancels the high impedance setting on the signal line connecting with the data signal terminal DT, so as to allow the data transfer at step S250. In this state, data transmitted to the data bus DB are sequentially written bit by bit at specific addresses (positions) in the memory array 201, which are specified by the count on the address counter 202 that is successively incremented synchronously with the rising edges of the clock signal SCK. The storage device 20 of this embodiment is accessed sequentially in this manner. The data transmitted from the host computer 10 accordingly have identical values (0 or 1) with the data currently stored in the memory array 201, except the data corresponding to addresses that require rewriting. Namely the data at the addresses in the memory array 201 that do not require rewiring are overwritten by the same values.

In the case of the read command (that is, in the case of negative answer at step S240), the operation code decoder 204 transmits the read command to the I/O controller 205. The I/O controller 205 receiving the read command changes the direction of data transfer with regard to the memory array 201 to the reading direction and cancels the high impedance setting on the signal line connecting with the data signal terminal DT, so as to allow the data transfer at step S260. In this state, data stored in the memory array 201 are sequentially read bit by bit from specific addresses (positions) in the memory array 201, which are specified by the count on the address counter 202 that is successively incremented synchronously with the rising edges of the clock signal SCK, and successively overwrite the contents of the first buffer memory in the I/O controller 205.

Only the data at the last addresses (the data at the addresses specified by the host computer 10) are eventually kept in the second buffer memory of the I/O controller 205. The data kept in the second buffer memory are transmitted to the data bus DB via the data signal line DT and transferred to the host computer 10 by the function of the I/O controller 205.

In response to re-input of the reset low signal, the address counter 202, the ID comparator 203, and the I/O controller 205 are initialized, and the data writing or reading process is terminated. The reading data or the writing data is established by the bit unit, and the re-input of the reset low signal is not required to establish the data. As mentioned previously, the reset signal RST is also output on the occasion of cutoff of power supply. Even when the power supply is accidentally cut off in the course of writing data, this arrangement enables the writing process to be normally concluded with regard to the data that have already been written. Data are written bit by bit in the procedure of this embodiment. There is accordingly no problem of abnormal conversion of data that have already been written.

In the case of cutoff of the power supply, the reset signal RST is output, and the power supply compensation circuit gives the compensational power supply for a predetermined time period when preferential data, such as the remaining quantity of ink or the quantity of ink consumption, is written first. That is, when the reset signal RST is output, the writing process, which is currently carrying, is interrupted. After interrupting the writing process, the first preferential data is written in the storage devices 20, 21, 22, 23 and 24, respectively, and then the second preferential data is written in the storage devices 20, 21, 22, 23 and 24, respectively. In the case where the writing operation is required for the plurality of storage devices 20, 21, 22, 23, and 24, this arrangement enables the preferential data to be properly and completely written in all the storage devices 20, 21, 22, 23, and 24.

Figure 9:
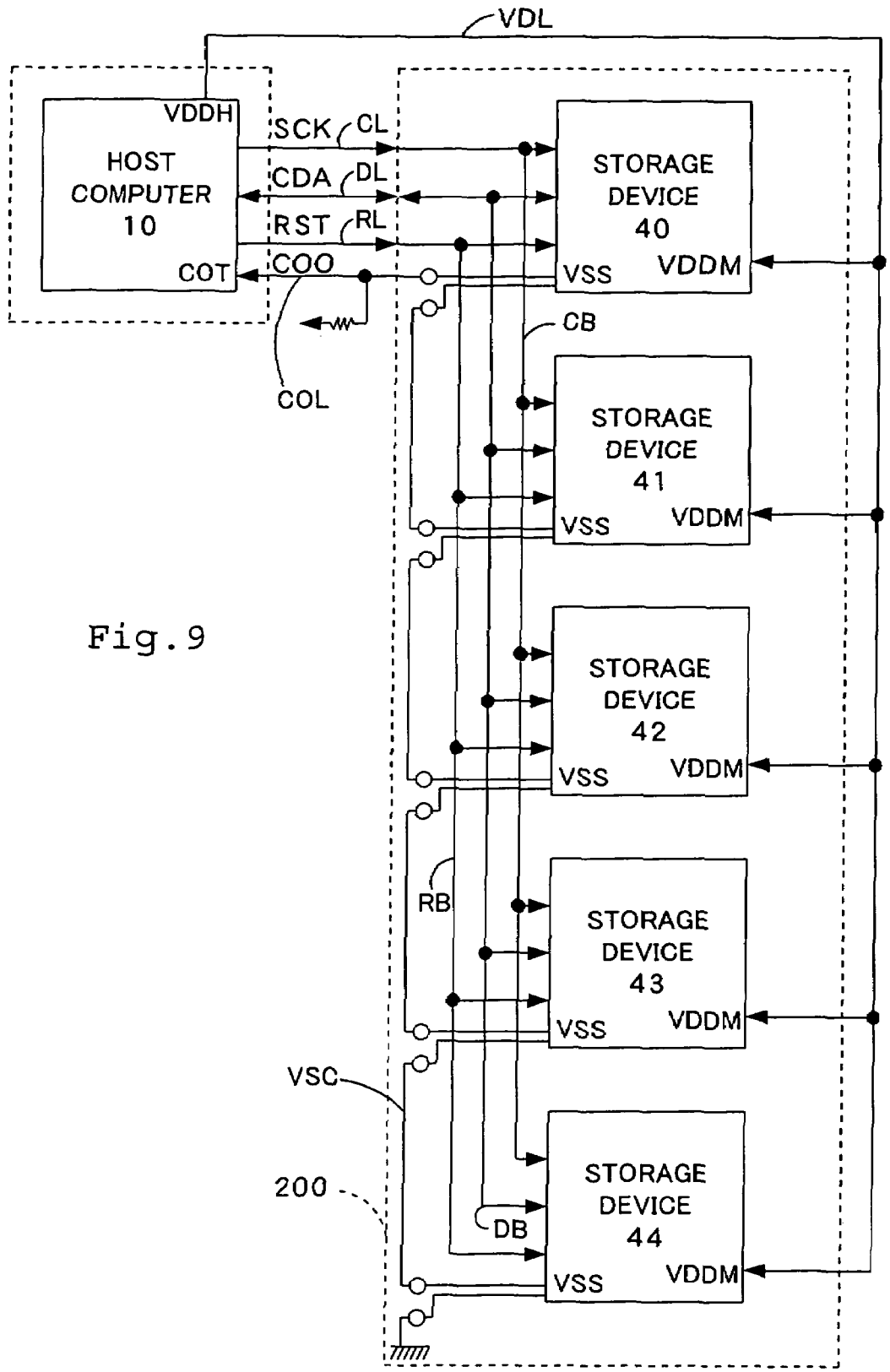
FIG. 9 illustrates the configuration of a storage system including a plurality of storage devices and a host computer in a second embodiment of the present invention.
Figure 10:
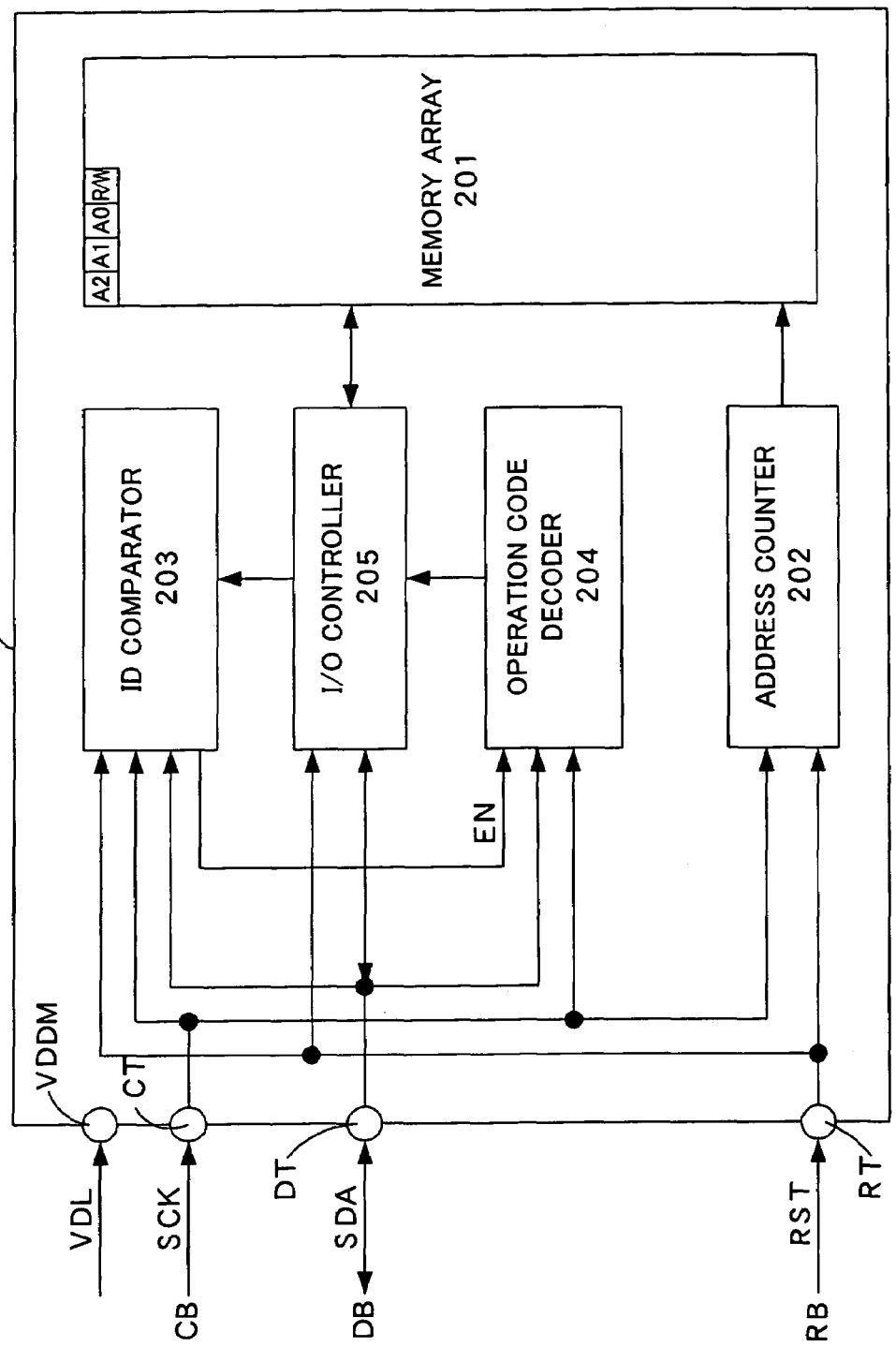
FIG. 10 is a block diagram illustrating the internal circuit structure of the storage device in the second embodiment.

Configuration of Storage System and Structure of Storage Device in Second Embodiment The following discussion regards the configuration of a storage system and the internal structure of a storage device in a second embodiment of the present invention with referring to FIGS. 9 and 10. FIG. 9 illustrates the configuration of a storage system including a plurality of storage devices and a host computer in the second embodiment of the present invention. FIG. 10 is a block diagram illustrating the internal circuit structure of the storage device in the second embodiment.

The storage system of the second embodiment is characterized by that each of storage devices 40, 41, 42, 43, and 44 included in the storage system does not have a test signal terminal TT for the test mode. The other constituents of the storage system of the second embodiment, which are identical with those of the storage system of the first embodiment, are expressed by the like numerals and are not specifically described here. As illustrated in FIG. 10, the storage device 40 has no test signal terminal TT nor a circuit corresponding to the factory setting unit 206 included in the storage device 20 of the first embodiment. The factory setting unit is required when identification information and data are written into the storage device according to a method discussed later as a third embodiment of the present invention. The factory setting unit is, however, not required when identification information and data are written into the storage device according to a method discussed later as a fourth embodiment of the present invention. The storage device 40 illustrated in the second embodiment accordingly does not have the circuit structure corresponding to the factory setting unit 206. The circuit structure of the storage device 40 other than the test signal terminal TT and the factory setting unit 206 is identical with the circuit structure of the storage device 20 of the first embodiment. The respective constituents are thus expressed by the like numerals and are not specifically described here. The general operations of the storage system and the storage device 40 of the second embodiment are similar to those of the storage system and the storage device 20 of the first embodiment, and are thus not specifically described here.

Figure 11:
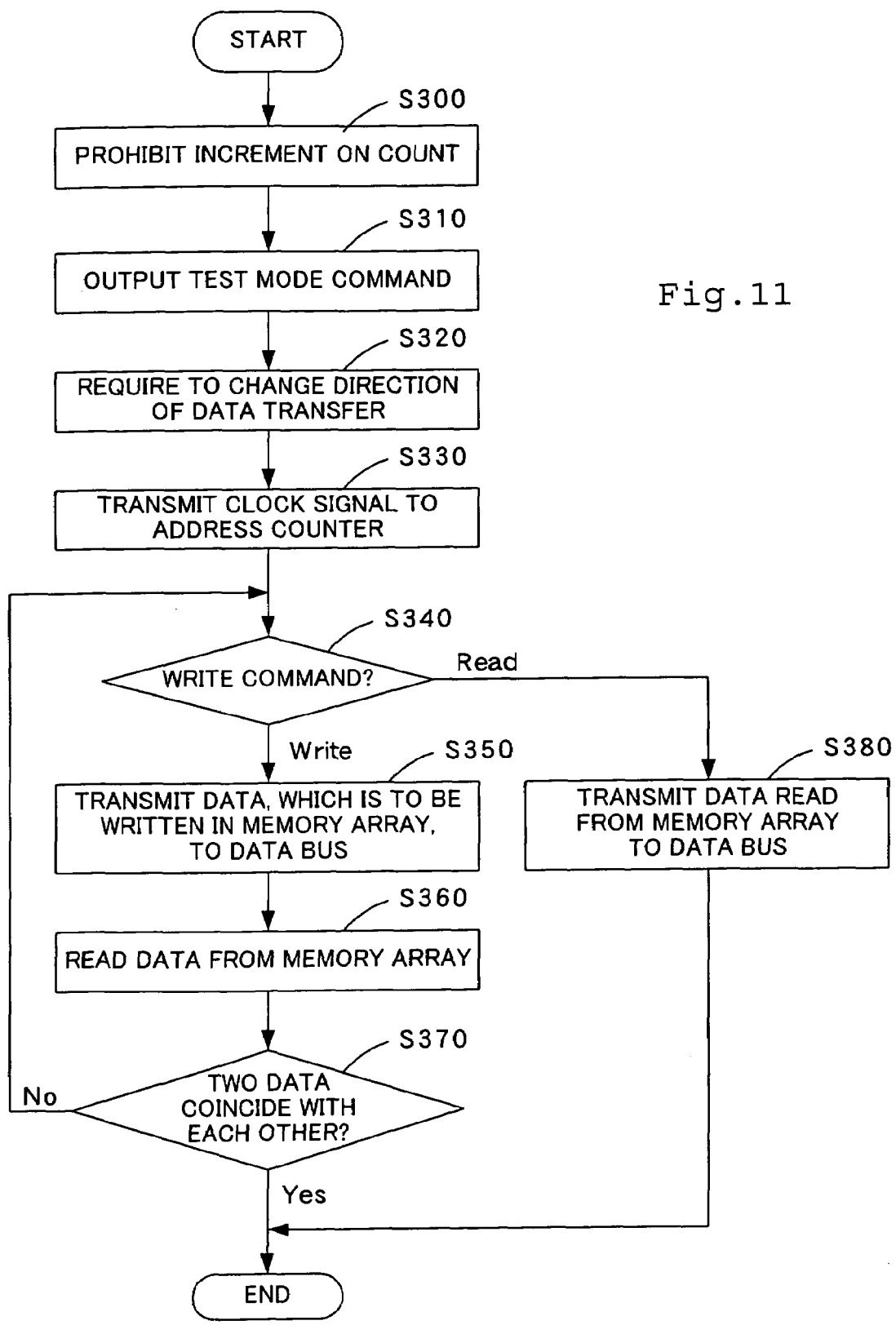
FIG. 11 is a flowchart showing a routine of writing process in the test mode in a third embodiment of the present invention.
Figure 12:
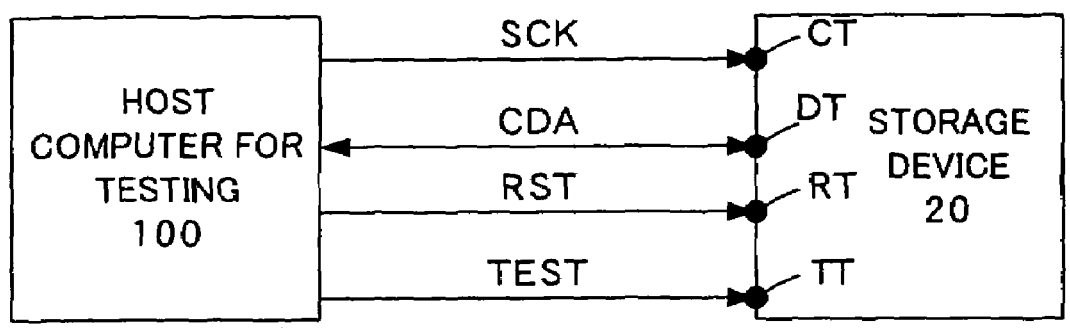
FIG. 12 shows one example of connection between a host computer for testing and a storage device to actualize the writing process in the test mode in the third embodiment.

D. Process of Writing Identification Data into Storage Device in Test Mode (in Factory Setting Process) in Third Embodiment The following describes a process of writing identification data and initial data into the storage devices 20, 21, 22, 23, and 24 in the test mode in a third embodiment of the present invention. FIG. 11 is a flowchart showing a routine of the writing process in the test mode in the third embodiment. FIG. 12 shows one example of connection between a host computer for testing and a storage device to actualize the writing process in the test mode in the third embodiment.

The writing process in the test mode according to the third embodiment is applied for the storage device having the identical internal circuit structure with that of the storage device 20 included in the storage system of the first embodiment. The respective constituents are thus expressed by the like numerals and are not specifically described here. The processing of the third embodiment is carried out under the connection of one-to-one mapping of signal lines from a host computer 100 for testing (or the host computer 10) to the respective terminals CT, DT, RT, and TT (probe) of the storage device 20 as shown in FIG. 12, while the storage device 20 is mounted on a new ink cartridge at the time of manufacture or while the storage device 20 is removed after collection of a used ink cartridge.

The processing routine of FIG. 11 starts after transmission of a Test signal from the host computer 100 to the storage device 20, that is, after shift of the processing to the factory setting process in the flowchart of FIG. 6. When the program enters the processing routine of FIG. 11, the factory setting unit 206 first prohibits transmission of the input clock signal to the address counter 202 and thereby increment of the count on the address counter 202 at step S300. The factory setting unit 206 then outputs a test mode command to the operation code decoder 204 at step S310. The test mode command causes the operation code decoder 204 to be activated without the access enable signal EN output from the ID comparator 203 and to obtain command data transmitted first to the data bus DB after input of the TEST signal. The data array input to the data bus DB in the test mode is shown in FIG. 3. The command obtained by the operation code decoder 204 is either the write command or the read command.

The operation code decoder 204 analyzes the obtained command and requires the I/O controller 205 to set the direction of data transfer with regard to the memory array 201 to either the writing direction or the reading direction and to make the signal line connecting the data bus DB with the I/O controller 205 in a data transfer enable state at step S320.

On completion of the command analysis, the operation code decoder 204 notifies the factory setting unit 206 of completion of the command analysis. The factory setting unit 206 receiving the notification transmits the input clock signal SCK to the address counter 202 at step S330. In the case where the result of analysis by the operation code decoder 204 shows the write command at step S340, data to be written at addresses of the memory array 201 specified by the count of the address counter 202 are successively transmitted to the data bus DB at step S350. The data following the write command may be written at addresses starting from '00' in the memory array 201. The 3-bit identification data following the write command can thus be written in the first 3 bits of the memory array 201.

The host computer 100 for testing reads the existing data from the memory array 201 at step S360, and compares the input data from the memory array 201 with the output data to the data bus DB to determine coincidence or incoincidence thereof at step S370. In the case of coincidence (that is, in the case of affirmative answer at step S370), the host computer 100 for testing determines that the writing process is concluded properly and terminates the factory setting process. In the case of incoincidence (that is, in the case of negative answer at step S370), on the other hand, the host computer 100 for testing carries out the data writing process again.

In the case where the result of analysis by the operation code decoder 204 shows the read command at step S340, on the other hand, data are successively read from addresses in the memory array 201 specified by the count on the address counter 202 and transmitted to the host computer 10 via the data bus DB at step S380.

Figure 13:
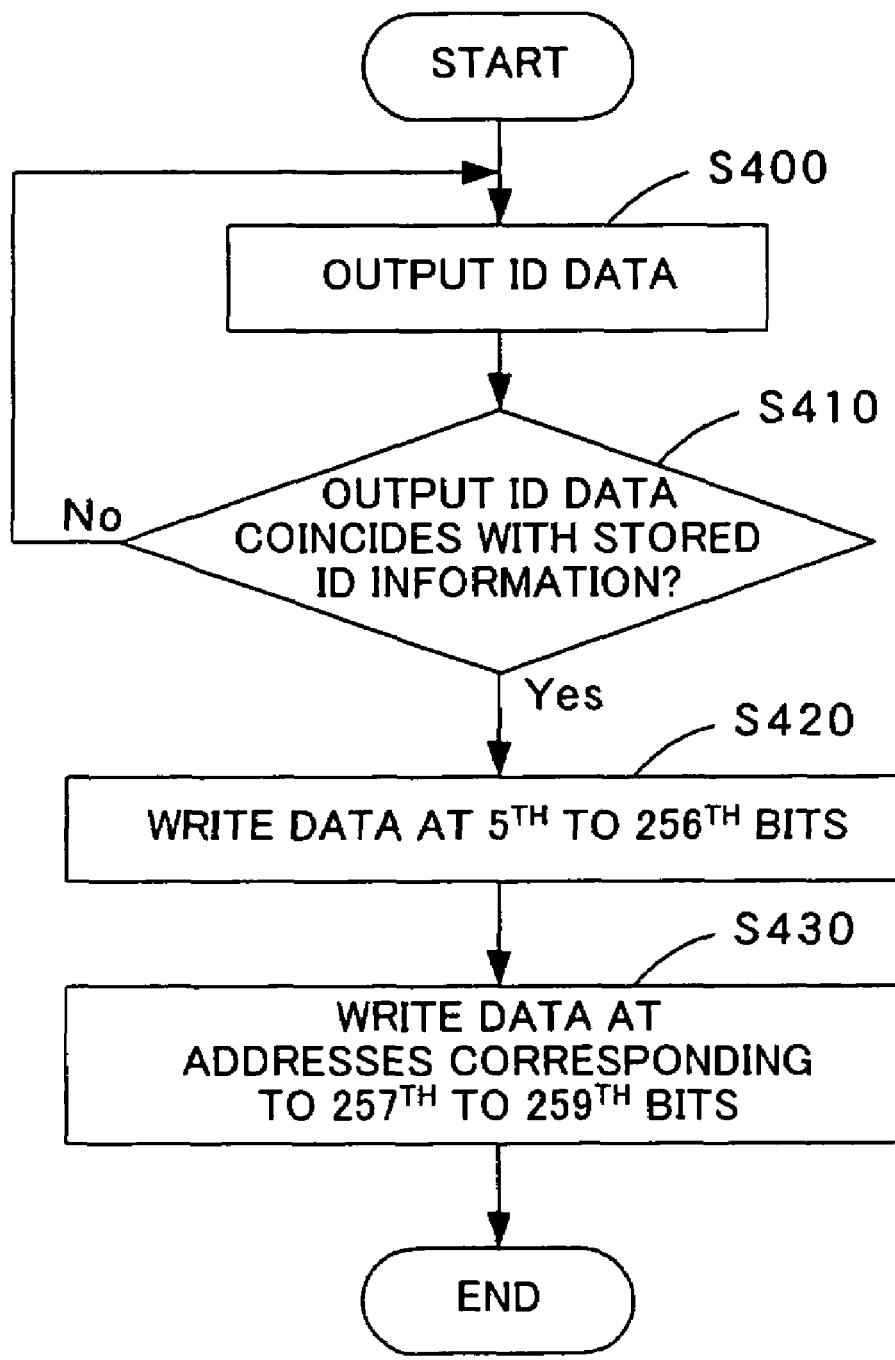
FIG. 13 is a flowchart showing a routine of writing process in the test mode in a fourth embodiment of the present invention.
Figure 14:
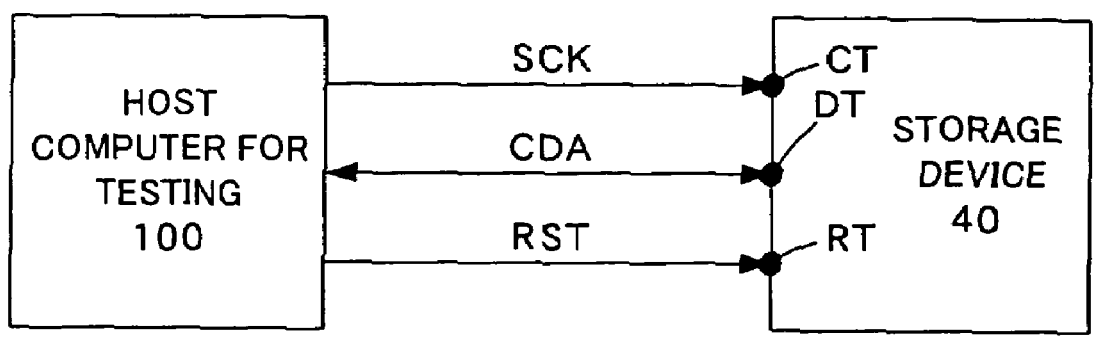
FIG. 14 shows one example of connection between the host computer for testing and a storage device to actualize the writing process in the test mode in the fourth embodiment.

E. Process of Writing Identification Data into Storage Device in Test Mode (in Factory Setting Process) in Fourth Embodiment The following describes a writing process in the test mode in a fourth embodiment of the present invention. FIG. 13 is a flowchart showing a routine of the writing process in the test mode in the fourth embodiment. FIG. 14 shows one example of connection between a host computer for testing and a storage device to actualize the writing process in the test mode in the fourth embodiment. The writing process of the fourth embodiment is applied for the storage device having the same internal circuit structure as that of the storage device 40 of the second embodiment. The respective constituents are thus expressed by the like numerals and are not specifically described here. The process of the fourth embodiment is characterized by the structure where the storage device 40 does not have the test terminal TT or the factory setting unit 206 to invalidate the ID check by the ID comparator 203 as shown in FIG. 10.

The processing of the fourth embodiment is carried out under the connection of one-to-one mapping of signal lines from the host computer 100 for testing (or the host computer 10) to the respective terminals CT, DT, and RT (probe) of the storage device 40 as shown in FIG. 14, while the storage device 40 is mounted on a new ink cartridge at the time of manufacture or while the storage device 40 is removed after collection of a used ink cartridge.

When the program enters the processing routine of FIG. 13, the host computer 100 for testing successively generates and outputs arbitrary ID data to the ID comparator 203 via the data bus DB at step S400 until the arbitrary output ID data coincides with the ID data stored in the memory array 201 at step S410. In the procedure of this embodiment, as both the ID data are 3-bit data, there are eight possible combinations.

The host computer 100 for testing carries out the determination of coincidence or incoincidence of the output ID data with the stored ID data, for example, according to the procedure discussed below. The operation code decoder 204 is set to require the I/O controller 205 to transmit a data array having all the values equal to 1 or equal to 0 in response to input of a write/read command, while the ID comparator 203 does not generate the access enable signal EN. In the case where the values of the data array are all equal to 1 or all equal to 0, the host computer 100 for testing determines that the output ID data does not coincide with the ID data stored in the storage device 40 and outputs another ID data to the storage device 40. In the case where the values of the data array are not all equal to 1 or not all equal to 0, on the other hand, the host computer 100 for testing determines that the output ID data coincides with the ID data stored in the storage device 40. Namely the host computer 100 for testing iteratively outputs arbitrary ID data to the storage device 40 and obtains the data array transmitted to the data bus DB until the output ID data coincides with the ID data stored in the storage device 40.

When the output ID data coincides with the ID data stored in the memory array 201 (that is, in the case of affirmative answer at step S410) and the access enable signal EN sent from the ID comparator 203 is detected, the host computer 100 for testing writes data of a specific capacity, which is equal to the capacity of the memory array 201, into the memory array 201 at step S420. In the structure of this embodiment, the memory array 201 has the capacity of 256 bits, so that the data having the capacity of 252 bits are written at writable $5^{th}$ to $256^{th}$ bits. The host computer 100 for testing subsequently writes the 3-bit data (ID data) at addresses corresponding to $257^{th}$ to $259^{th}$ bits at step S430. Since data have already been written at the addresses up to the $256^{th}$ bit in the memory array 201, the 3-bit data is written in the first 3 bits, that is, at the $1^{st}$ to $3^{rd}$ bits, of the memory array 201. This results in writing the ID data in the first 3 bits of the memory array 201.

The host computer 100 for testing may alternatively monitor the access enable signal EN generated by the ID comparator 203 to determine coincidence or incoincidence of the output ID data with the ID data stored in the storage device 40. The ID comparator 203 generates the access enable signal EN when the output ID data coincides with the ID data stored in the storage device 40.

The technique of this embodiment enables the memory array 201 to be overwritten with new identification information, irrespective of the current identification information stored in the storage device 40, when the storage device 40 is removed from the collected ink cartridge. The storage device 40 does not require the factory setting unit 206 and accordingly has a less number of circuit structures.

Figure 16:
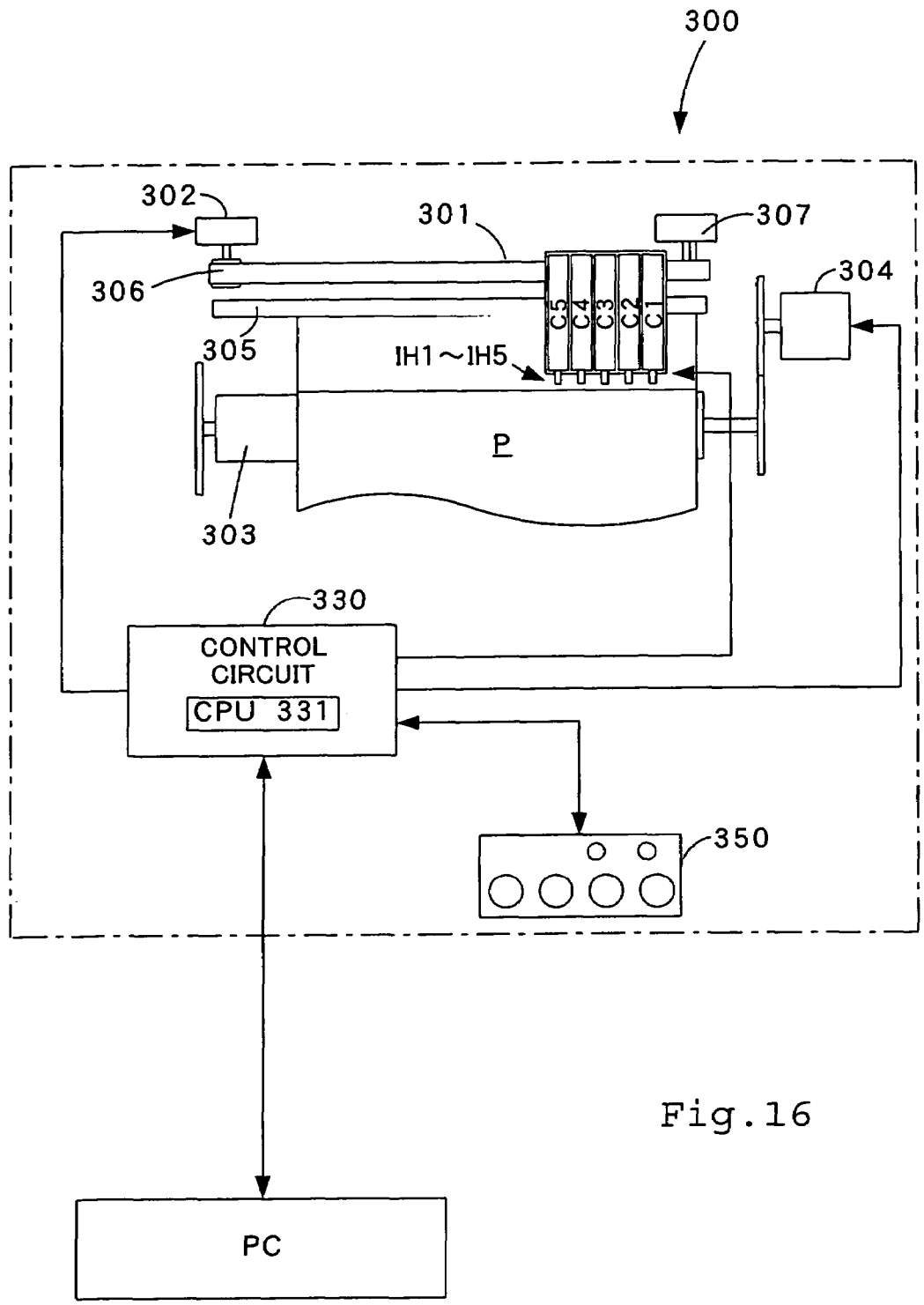
FIG. 16 schematically illustrates the internal structure of an ink jet printer as an example, to which any of the storage systems of the above embodiments is applicable.

Any of the arrangements discussed above in the respective embodiments is applied to, for example, an ink jet printer shown in FIG. 16. FIG. 16 schematically illustrates the internal structure of an ink jet printer as an example, to which any of the storage systems of the above embodiments is applicable.

Referring to FIG. 16, a color ink jet printer 300, which is capable of generating color images, creates a dot pattern on a printing medium (for example, printing paper), for example, with ejected five color inks, cyan (C), light cyan (LC), magenta (M), light magenta (LM), and yellow (Y) to print an image. The principle of the present invention is also applicable to printers of the electrophotographic technique that transfer and fix color toners on the printing medium to print an image, as well as to color ink jet printers.

The color ink jet printer 300 has a mechanism of actuating print heads IH1 to IH5 mounted on a carriage 301 for ink ejection and dot creation, a mechanism of driving a carriage motor 302 to move the carriage 301 back and forth along the axis of a platen 303, a mechanism of driving a sheet feed motor 304 to feed sheets of printing paper P, and a control circuit 330 (corresponding to the host computer 10). The mechanism of reciprocating the carriage 301 along the axis of the platen 303 includes a sliding shaft 305 that is arranged in parallel with the axis of the platen 303 to support the carriage 301 in a slidable manner and a pulley 307 that is combined with the carriage motor 302 to support an endless drive belt 306 spanned therebetween.

The control circuit 330 transmits signals to and from an operation panel 350 of the printer 300 and adequately controls the operations of the sheet feed motor 304, the carriage motor 302, and the print heads IH1 to IH5. The ink cartridges C1 to C5 described in the above embodiments are attached to the carriage 301.

The sheet of printing paper P supplied to the color printer 300 is held between the platen 303 and a sheet feed roller and fed by a predetermined length corresponding to the rotating angle of the platen 303. A CPU 331 incorporated in the control circuit 330 writes and reads data into and from the storage devices mounted on the ink cartridges C1 to C5, in response to control signals output from a personal computer PC. The control circuit 330 also controls the operations of the respective constituents of the printer 300 to implement printing operations, in response to print control signals output from the personal computer PC.

The storage devices 20, 21, 22, 23 and 24 mounted on the carriage 301 are connected with the control circuit 330 by a flexible cable that contains the signal lines. A movement of the carriage 301 deforms the flexible cable, and a deformation of the flexible causes an elastic forces. The elastic forces hamper the smooth movement of the carriage 301. In some cases, an additional motor control for the carriage motor 302 is required to realize the smooth movement of the carriage 301. The elastic forces of the flexible cable increase in proportion to the number of the signal lines included in the flexible cable. In the present embodiments, the storage devices 20, 21, 22, 23 and 24 are connected via the bus each other on the memory module substrate 200. The bus connection reduces the number of the signal lines between the control circuit 330 and the memory module substrate 200. Therefore, the present embodiments can reduce an affection of the elastic forces and realize the smooth movement of the carriage 301.

Reducing the number of signal lines in the flexible cable also can reduce the occurrence of noise that is caused by the signal line. This advantage is useful when two terminals are contacted with by a face-contact. It is preferable to reduce noise factors, especially when the face-contact is employed.

In any of the configurations of the storage systems discussed above in the first through the fourth embodiments, the identification data is stored in the 3-bit head area of the memory array of each storage device. This arrangement enables selection of a desired storage device among a plurality of storage devices. The area for storing the identification data is the read only area in the normal mode but allows writing in the test mode. The identification data can thus be rewritten easily. This arrangement facilitates rewriting the identification data when a storage device is removed from a used ink cartridge and attached to a new ink cartridge. This accordingly enhances the recycle of the storage devices.

The above description regards the storage systems and the storage devices in some preferred embodiments of the present invention. These embodiments are, however, to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given) below.

In the above embodiments, the EEPROM is, for example, used for the storage device. Any storage element other than the EEPROM is, however, applicable to the storage device of the present invention, as long as the storage element enables data to be stored in a non-volatile but rewritable manner.

In the above description, the data regarding the remaining quantity of ink and the quantity of ink consumption are enumerated as the preferential data. Any other suitable data in place of or in addition to such data may be specified as the preferential data.

In the storage system including the plurality of storage devices discussed above, the identification data for gaining access to a certain storage device are stored in first 3 bits of a memory array 201 of the certain storage device. The capacity of the identification data may be varied adequately according to the number of storage devices to be identified. The capacity of the memory array 201 is not restricted to 256 bits but may be varied adequately according to the capacity of data to be stored.

In the above embodiments, the five storage devices are mounted on the five separate ink cartridges of five different color inks. The storage devices may also be applied for ink cartridges of 2 to 4 different color inks or 6 or more color inks.

In the above embodiments, the storage device is applied for the ink cartridge of the ink jet printer to store various pieces of information on the ink cartridge. The storage device of the present invention may also be used in a diversity of other applications.

What is claimed is:

1. A printing material container detachably attached to a printing apparatus having a data signal line, and a reset signal line, said printing material container comprising:

a reservoir unit that keeps a printing material therein;

a data terminal that transmits a data signal to the data signal line of said printing apparatus and that receives a data signal from the data signal line of said printing apparatus;

a reset terminal that receives a reset signal sent via the reset signal line of said printing apparatus;

a storage element having a plurality of non-volatile storage areas;

a storage element control unit that sets a direction of data transfer with regard to the storage element to a reading direction at a first level of the input reset signal and sets the direction of data transfer with regard to the storage element to a reading or writing direction based on the data signal from the data signal line of said printing apparatus after the reset signal is switched over to a second level which is different from the first level;

a clock terminal that receives a clock signal sent via a clock signal line of said printing apparatus, wherein the storage element stores identification information therein, and the storage element control unit comprises:

a signal line that is connected with the data terminal;

an address counter that specifies a position in the storage areas to be accessed by a count synchronously with the clock signal input via the clock terminal and resets the count to an initial value in response to input of the reset signal via the reset terminal;

an input-output controller that is electrically connected with both the storage element and the signal line and controls a direction of data transfer with regard to the storage element as well as a direction of data transfer with regard to the signal line connected with the data terminal;

a comparator that compares printing material container identification information, which is assigned to said printing material container for identification thereof and is input via the data terminal, with identification information stored in the storage element to determine coincidence or incoincidence of the two pieces of identification information; and a write/read enable unit that allows the writing/reading operation of the data signal into and from the storage element in the case of coincidence of the two pieces of identification information.

2. A printing material container in accordance with claim 1, wherein the input-output controller cuts off connection with the data terminal at the first level of the reset signal.

3. A printing material container in accordance with claim 2, said printing material container further comprising:

a command decoder that connects with the data terminal and the comparator, analyzes a write/read command input via the data terminal when a result of the determination by the comparator represents coincidence of the printing material container identification information with the identification information stored in the storage element, and requires the input-output controller to switch over the direction of data transfer with regard to the signal line based on a result of the analysis, wherein the input-output controller keeps the direction of data transfer with regard to the storage element at a time of initialization and the cutoff state of connection with the data terminal until the command decoder completes the analysis of the write/read command.

4. A printing material container in accordance with claim 1, wherein the storage element has a writable data area, in which data are writable, after a storage area of the identification information.

5. A printing material container in accordance with claim 4, wherein data regarding at least a quantity of the printing material is written into the writable data area.

6. A printing material container in accordance with claim 4, wherein the storage element has a specific section between a head position and a predetermined position of the storage area, the specific section being subjected to a writing operation under a predetermined condition and otherwise storing the identification information in an unrewritable manner.

7. A printing material container in accordance with one of claims 1 to 3 and 4 to 6, wherein the plurality of non-volatile storage areas are sequentially accessed.

* * * * *